Sept. 2, 1941.  H. A. FOOTHORAP  2,254,694
COMBINED CALCULATING AND RECORDING MACHINE
Original Filed Dec. 30, 1932  13 Sheets-Sheet 4

Inventor
HARRY A. FOOTHORAP
Attorney

Sept. 2, 1941.    H. A. FOOTHORAP    2,254,694
COMBINED CALCULATING AND RECORDING MACHINE
Original Filed Dec. 30, 1932    13 Sheets-Sheet 5

Inventor
HARRY A. FOOTHORAP.
L. G. Julihn
Attorney

Sept. 2, 1941. H. A. FOOTHORAP 2,254,694
COMBINED CALCULATING AND RECORDING MACHINE
Original Filed Dec. 30, 1932 13 Sheets-Sheet 10

Inventor
HARRY A. FOOTHORAP
Attorney

Sept. 2, 1941.  H. A. FOOTHORAP  2,254,694
COMBINED CALCULATING AND RECORDING MACHINE
Original Filed Dec. 30, 1932  13 Sheets-Sheet 11

Inventor
HARRY A. FOOTHORAP
Attorney

Sept. 2, 1941.     H. A. FOOTHORAP     2,254,694
COMBINED CALCULATING AND RECORDING MACHINE
Original Filed Dec. 30, 1932    13 Sheets-Sheet 12
Fig. 14.
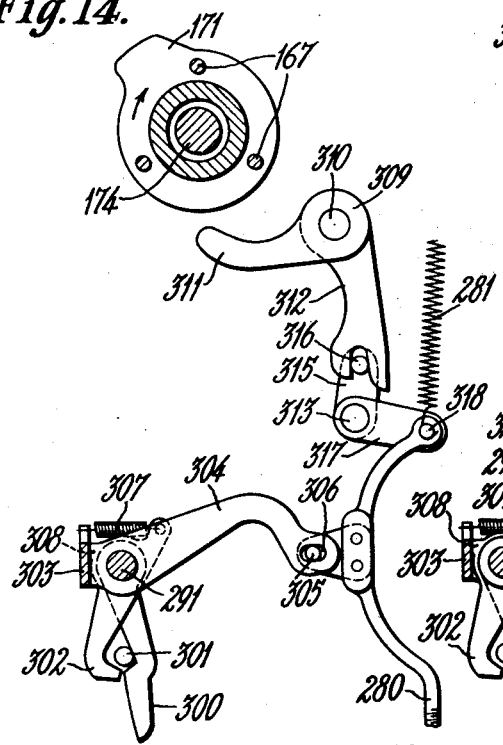
Fig. 15.
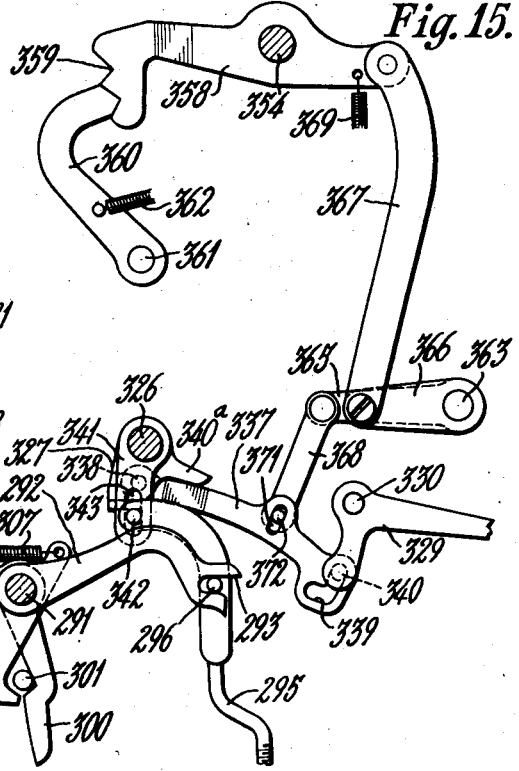
Fig. 15ᵃ.
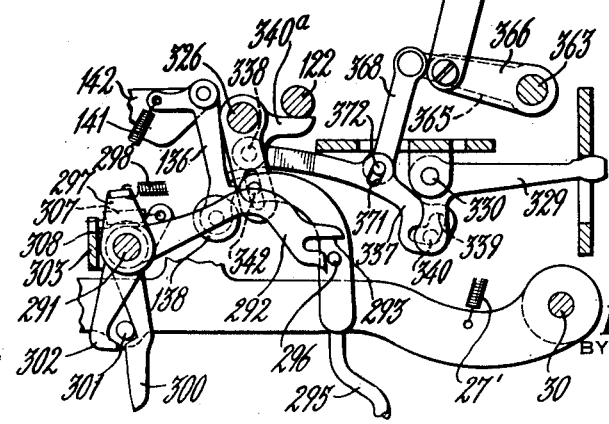
INVENTOR
Harry A. Foothorap
BY
L. G. Julihn
ATTORNEY Sept. 2, 1941. H. A. FOOTHORAP 2,254,694
COMBINED CALCULATING AND RECORDING MACHINE
Original Filed Dec. 30, 1932 13 Sheets-Sheet 13
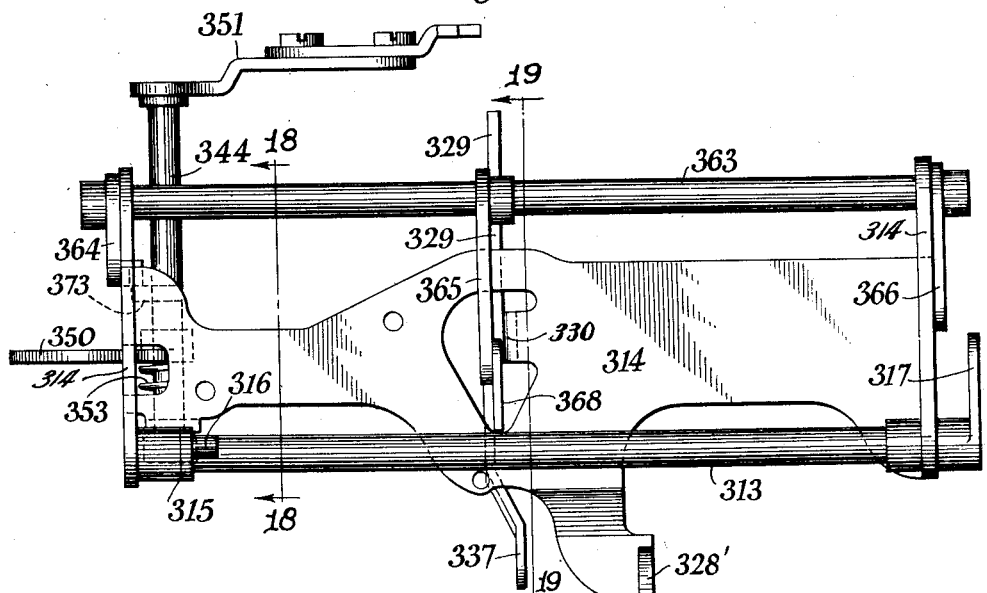
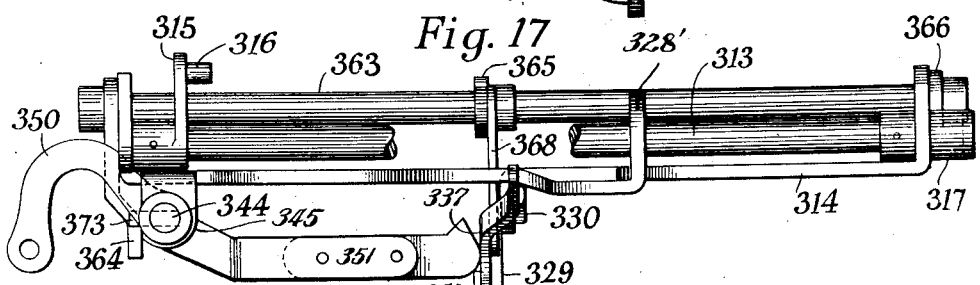
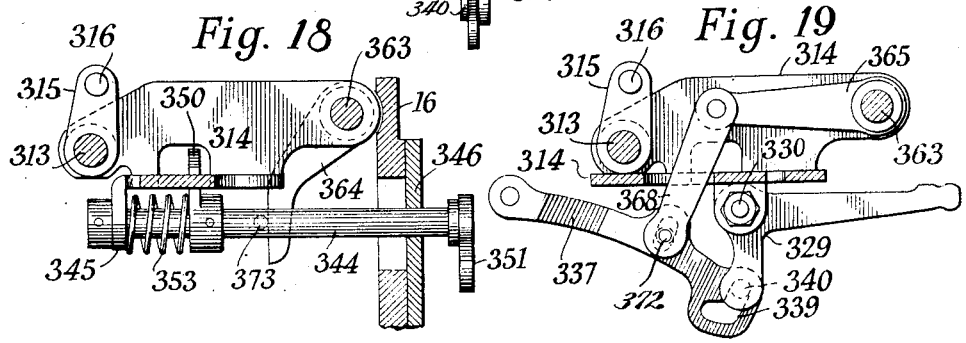
Inventor
HARRY A. FOOTHORAP
Attorney Patented Sept. 2, 1941

2,254,694

UNITED STATES PATENT OFFICE 2,254,694

COMBINED CALCULATING AND RECORDING MACHINE

Harry A. Foothorap, Harrisburg, Pa., assignor to Underwood Elliott Fisher Company, New York, N. Y., a corporation of Delaware Original application December 30, 1932, Serial No. 649,663. Divided and this application April 4, 1938, Serial No. 199,837

29 Claims. (Cl. 235—130)

My invention relates to combined calculating and recording machines, and more particularly to improvements in combined calculating and typewriting machines of the class known commercially as the Elliott-Fisher billing machine.

By way of explanation, the Elliott-Fisher machine, with which my invention is particularly concerned, is a combined calculating and typewriting mechanism distinguished, in its typewriting aspect, by down strike printing mechanism, and keys mounted on a carriage to travel over a subjacent flat platen. Viewed in its computing aspect, it is characterized by one or more so-called column registers past which the carriage travels, a grand totalizer or crossfooter register mounted on and travelling with the carriage, and column and crossfooter register master wheels or actuators mounted on the carriage and crossfooter register frames, respectively, to effect denominational selection in their related registers, incident to the step by step letter spacing travel of the carriage, and operated in synchronism by the number keys of the machine, to accumulate values in the registers as they are printed digit by digit in different columns. Usually the carriage is adapted to travel over the work to both line and letter space the printed record.

In its broad aspect, an important object of my invention is to equip a machine of the above designated class for motor operation of the register mechanism under control of the value keys of the machine, to the end that said keys are free from all load other than that incident to operation of the typewriting mechanism.

Another important object is to equip such a machine for carriage retraction, register operation under control of the value keys, and line spacing of the work, all by means of a single motor.

Another object of the invention is to provide, in such a machine, a shiftable frame supporting the carriage and registers, which frame is shiftable, at an angle, from and to the plane of the work, differential mechanism on the carriage for operating the registers under control of the keys, and a motor on the frame in constant driving relation to the differential mechanism on the carriage in any position of the latter.

Still another object is to provide differential mechanism on the carriage, including stops automatically set under control of the value keys, stop resetting mechanism, means normally locking the differential mechanism against operation, and a general operator on the carriage driven by a motor on the frame, and operatively related to the locking means and stop resetting mechanism to unlock the differential mechanism and reset the stops.

Still another object is to provide for locking the carriage in position under control of the keys during operation of a register, and unlocking said carriage by operation of said general operator.

To the accomplishment of the foregoing and other and subordinate objects, one embodiment of my invention has been illustrated in the accompanying drawings and will now be set forth in detail, and defined in the claims appended hereto.

Reference is herein directed to my co-pending parent application filed December 30, 1932, Serial No. 649,663, now Patent No. 2,145,254, issued January 31, 1939, of which this application is a division, and to my co-pending application filed November 11, 1935, Serial No. 49,158, now Patent No. 2,126,320, dated August 9, 1938, as a divisional part of the parent application, for claims to such features of my invention as are shown or described but not claimed herein.

In the drawings:

Fig. 14 is a detail view in side elevation, partly in section, showing the key locking and escapement locking mechanisms;

Fig. 15 is a similar view, illustrating the association of the key locking and escapement locking mechanisms with the automatic key connecting and disconnecting mechanism in its effective position, and the means for disabling the escapement locking and the key connecting and disconnecting mechanisms;

Fig. 15a shows the relative positions of the parts of the key-controlled latch-tripping mechanism when the connection between the keys and latch is manually disconnected;

Fig. 16 is a top plan view of a supporting bracket for parts relating to the escapement locking mechanism, the key connecting and disconnecting mechanism, the decimal spacing mechanism, and the means which controls the effectiveness of such mechanisms;

Fig. 17 is a front elevation of the parts shown in Fig. 16;

Fig. 18 is a sectional view on line 18—18 of Fig. 16, including part of the key carriage of the machine;

Fig. 19 is a detail sectional view on line 19—19 of Fig. 16; and

For convenience in description, the various units of the machine of my invention will be described under appropriate headings as follows:

MAIN SUPPORTING STRUCTURE

Figure 1:
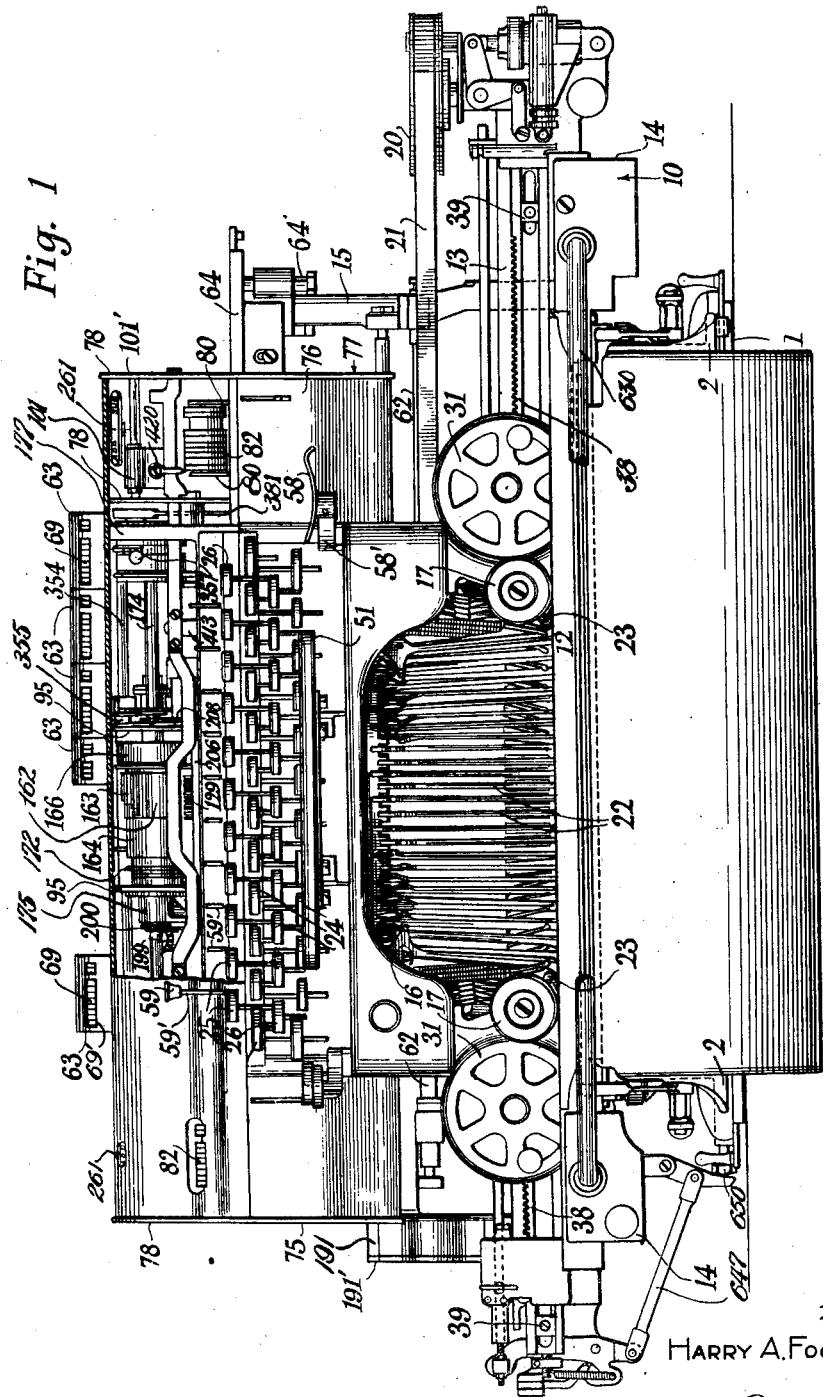
Fig. 1 is a front elevation of a flat bed writing machine of the Elliott Fisher type, equipped with one form of this invention.

Referring particularly to Fig. 1, the base proper 1 of the machine includes laterally spaced side bars 2 connected together by front, rear and intermediate crossbars, not shown.

Surmounting the base 1 is an elevatory track frame 10 arranged for vertical swinging movement from a normally horizontal position relatively to the base 1. Included in the frame 10 are front and rear members in the form of track rails 12, extending transversely of the base 1, and side members 14 extending longitudinally of said base and terminating at their rear ends in upstanding brackets 15.

RECORDING OR PRINTING MECHANISM

The printing mechanism is of the usual Elliott-Fisher class disclosed, substantially, in my U. S. Patent No. 1,251,361, dated December 25, 1917.

Suffice it to explain that a carriage 16, is mounted by sets of front and rear rollers 17 on the rails 12 of the tilting frame 10 for advance and retraction in letter and contra-letter feeding directions, respectively. A power barrel 20 mounted on the frame 10 and connected to the carriage 16 by a tape 21, advances said carriage. Mounted on the carriage 16, (see Figs. 1 to 6 particularly), are down strike type bars 22 operated through connections 23, by letter keys 24, value keys 25, and clear signal keys 26, fixed on key levers 27, 28 and 29, respectively, fulcrumed in the carriage 16 on a rod and tensioned by springs 27'. As is well known, the function of the clear signal key 26 in the Elliott-Fisher machine is to print a signal, such as a star, in connection with clearing operations in a crossfooter register, as explained for instance, in my U. S. Patent No. 1,505,384, dated August 19, 1924. The machine of my present invention embodies two crossfooter registers, and hence two such clear signal keys 26.

Figure 7:
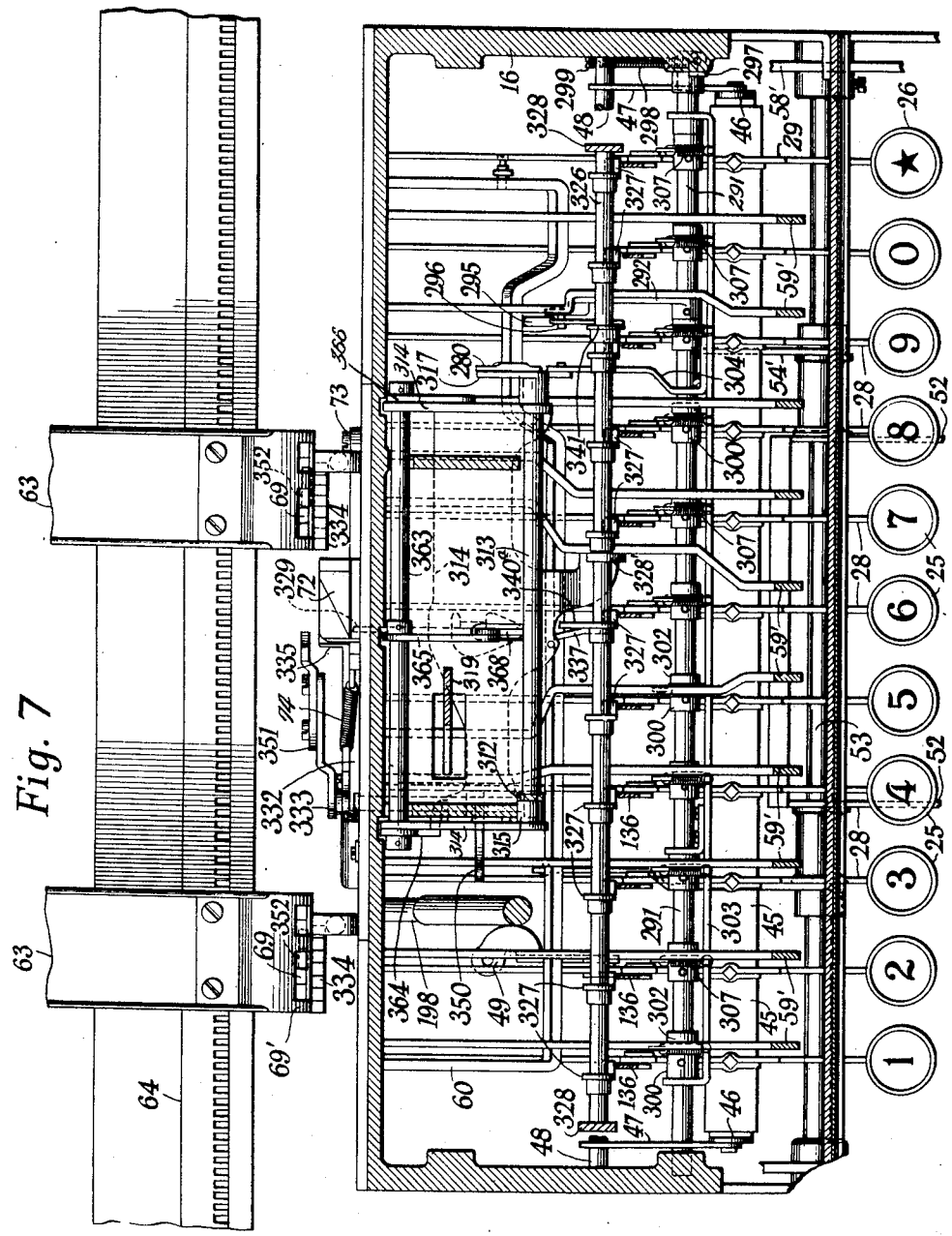
Fig. 7 is a sectional top plan view of one form of my invention, taken on line 7—7 of Fig. 2.

At this point, it may be stated that the machine illustrated is designed for use, preferably, in computing according to the decimal system. It is, therefore, disclosed with a bank of value keys 25, (Fig. 7), ranging from "1" to "9" followed by "0" and, as is usual in these machines, with one clear signal printing key 26 included in said bank and following the "0" key thereof. It is contemplated, however, that the machine be adaptable for computing English currency. Insofar as the printing mechanism is concerned, such adaptation may be effected by substituting, in the place of the "0" and clear signal keys of the value key bank, keys bearing the values "10" and "11", respectively, and substituting appropriate type bars for those with which the "0" and clear signal keys were related. In this event, as will be understood, the "0" key of the letter key group is used in the printing of a zero.

The machine is equipped with the usual well-known ribbon mechanism, including ribbon spools 31, (Fig. 1), and a color controlling ribbon shift key 34.

ESCAPEMENT MECHANISM

Suspended from the carriage 16, by a bracket 35, (Fig. 8) is escapement mechanism, for the details of which reference may be had to my U. S. Patent No. 1,203,519 of October 31, 1916. Generally speaking, (see Figs. 1 to 3, and 7 to 9), this mechanism includes an escapement wheel 36, a carriage feed pinion 37 engaging a carriage feed rack 38 mounted on the front face of the track rail 13, holding and spacing dogs 40 and 41, (Fig. 8), operatively connected by a link 42 and a spring 43, to effect a step by step rotation of said wheel 36 and pinion 37, and a spacing dog actuator 44. The escapement is operated by the key levers 28, (Figs. 2, 3 and 8), through a universal bar 45, suspended by bail arms 46 from crank arms 47, fast on a rock shaft 48 suitably journaled in the sides of the carriage 16. A rocker arm 49, fast on the shaft 48, and an escapement draw rod 50, operatively connect the shaft 48 with the spacing dog 41. The usual space bar 51, (Figs. 1, 2, 8 and 9), fixed upon arms 52 pivoted at 53 on the carriage, is operatively connected by the draw rod 54 and crank arm 54' to the dog actuator 44.

TABULATING MECHANISM

The tabulating mechanism is substantially such as is disclosed in my U. S. Patent No. 1,280,697, dated October 8, 1918. As will be understood, upon reference to said patent, a carriage tabulator key 58, (Fig. 1), and key levers 58', together with decimal tabulator keys 59, (Figs. 1 to 3, 5 and 6), and key levers 59' are operatively connected to a series of stop blades (not shown) on the carriage 16, and also to the escapement through an escapement releasing bail 60, suitably pivoted concentrically with the key levers 59', to effect a cooperative engagement of said stop blades with fixed tabulator stops adjustable along the usual stop bar 62, (Fig. 1), secured in this instance, to the brackets 15 of the tilting frame 10.

COMPUTING MECHANISM

*Column registers*

In the rear of the carriage 16 are the column registers 63, (Figs. 1 and 7), one for each column of work, as will be understood, mounted on a register bar 64 secured by screws 64' to the brackets 15 of the frame 10. The registers 63 are of the two-way, reversible type embodying the usual denominational value indicating wheels 69 visible through sight openings 69', toothed denominational number wheels (not shown) driving the wheels 69, and two-way transfer and transfer restoring mechanisms, respectively, of a well-known type (not shown). The usual transfer restoring slide projects from each column register 63 for operation, upon retraction of the carriage 16, by a restoring cam 72, (Fig. 7), pivoted to the carriage at 73 and tensioned by a spring for operation in a manner well-known in the art.

Crossfooters or grand totalizers

Suitably secured to the right and left hand sides of the carriage 16 to travel therewith are crossfooters or grand totalizers 75, 76, (Fig. 1), respectively, which are identical in construction. Hence, a description of one will suffice for both. The crossfooter main frame 77 includes right and left side plates 78 and a rear plate enclosing a crossfooter register sub-frame, the sides 80 of which sub-frame embrace the register per se. The denominational value indicating wheels 82 of such register are journaled on a shaft mounted in the sides 80 of the sub-frame, and are adapted to be driven in opposite directions for addition and subtraction, respectively, by toothed denominational number wheels, also mounted in the sub-frame. Associated with the number wheels is a two-way transfer mechanism of the type disclosed in my U. S. Patent No. 1,576,961, dated March 16, 1926.

Denomination selecting means for column registers

Mounted at the rear of the carriage 16, (Figs. 2, 7 to 9), between brackets 95 upstanding from a carriage top plate 96, (Fig. 9), is the usual toothed actuator or master wheel 97 fast upon a master wheel shaft 98 journaled at its opposite ends in said brackets. The master wheel 97 is advanced laterally step by step with the carriage 16 in the usual manner, well understood in the art, to select the number wheels of the column registers for operation in denominational correspondence with the orders in which digits are printed in the columns.

Denomination selecting mechanism for crossfooters

Denomination selection in the crossfooters 75 and 76 is effected in correspondence with the order of printing by the following means. Each crossfooter 75 and 76 includes the usual toothed master wheel and squared master wheel shaft 101' for rotating said master wheel, and along which the master wheel advances laterally across the number wheels of the crossfooter register. The crossfooter master wheel shafts 101' are connected with the column register master wheel shaft 149 in a manner well-known in the Elliott-Fisher type of machine, not shown.

VALUE SELECTING MECHANISM

Value selecting stops

A short shaft 119 extending transversely of the carriage 16 supports a series of independently rocking stops 120, (Figs. 2, 8, 9 and 11 to 13), arranged in line centrally of the carriage, in equidistantly spaced relation to swing in vertical planes from their normally ineffective to their effective positions, and vice versa. The stops 120 are immovable longitudinally of the shaft 119, but said shaft and stops are bodily shiftable endwise from and to their normal positions of rest, respectively, for a purpose later described, the shaft 119, for this purpose being mounted in and extending between the parallel walls 121 of a sub-frame located intermediate the brackets 95 and supported upon tie rods 122 connecting the brackets 95. Collars 119ª and 119ᵇ, (Figs. 8 and 9), on the shaft limit such axial movement of the shaft 119 through engagement with the sub-frame walls 121. There are eleven stops 120, each including an upstanding stop arm 123, a rearwardly extending resetting beak 124 and a depending operating or setting lug 125.

Stop setting mechanism

The stops 120 are set by motor-operated setting mechanism, (see Figs. 2 and 11 to 13), as follows: A series of closely-placed, normally horizontal stop setting slide levers 126, one for each stop, extend forwardly of the latter. Each stop setting slide lever has its rear end pivoted, as at 127, to the operating lug 125 of its related stop 120, and is provided at its forward end with an upstanding abutment portion 128 terminating in a forwardly extending finger 129 at all times overlying a rocking, spring-restored motor-control bail 206, the function of which will presently appear. Individual stop setting motor springs 130 for the slide levers 126 have their opposite ends suitably connected to their associated slide levers and to a fixed bar 131, respectively, to urge the setting slide levers endwise rearwardly. Rearward movement of the setting slide levers 126, rocks the stops 120 in a direction to move their stop arms 123 forwardly and to elevate their resetting beaks 124. A stationary stop bar 132 extends between and is suitably fastened at its opposite ends to the side walls 121 to overlie the stop setting slide levers 126 in rear of the abutment portions 128 for cooperation with the latter, to limit rearward movement of said slide levers and thus establish the effective positions of the stops 120. The forward ends of the slide levers 126 are normally urged upwardly, by the spring-restored motor control bail 206, against the lower edge of the stop bar 132, and are provided in rear of the abutment portions 128, with latching shoulders 133 normally engaging the front edge of the stop bar 132 to latch the slide levers 126 against rearward movement, and thus establish the normal ineffective position of the stops 120.

MEANS FOR CONTROLLING THE STOP SETTING MECHANISM BY THE VALUE KEYS

Figure 2:
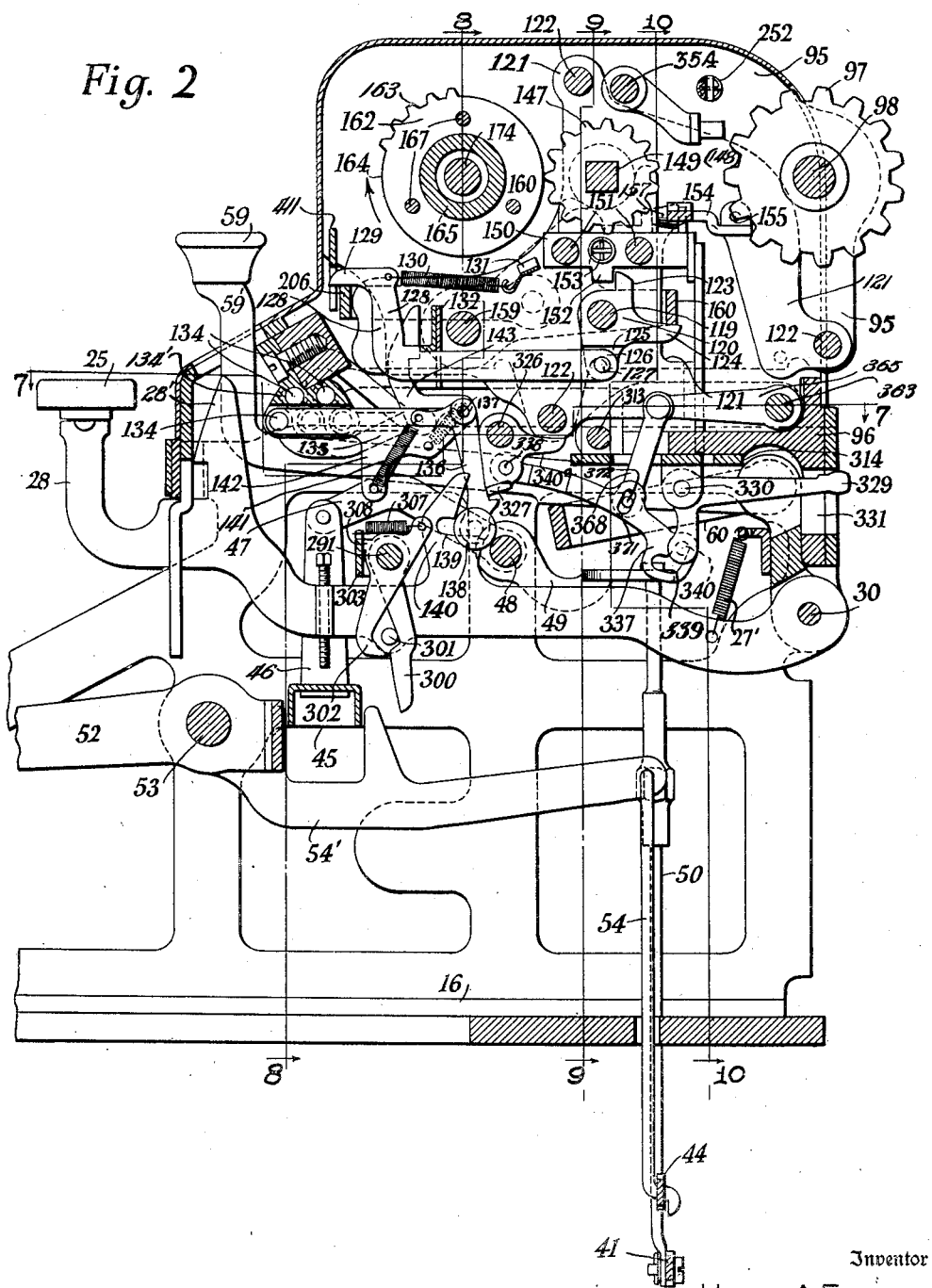
Figs. 2, 3 and 4 are longitudinal sectional views, taken on different vertical planes, respectively, looking from the right side of the machine, to show the numeral key mechanism, and associated parts.
Figure 13:
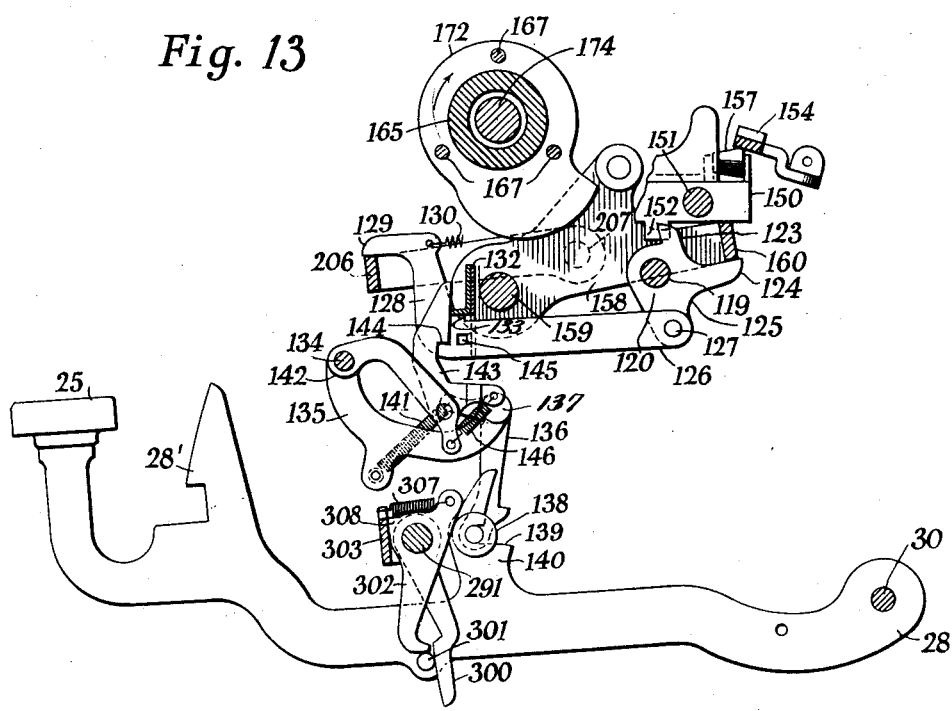
Fig. 13 is a similar view, showing the depressed key held in locked position to afford the accumulation mechanism time to operate.
Figure 20:
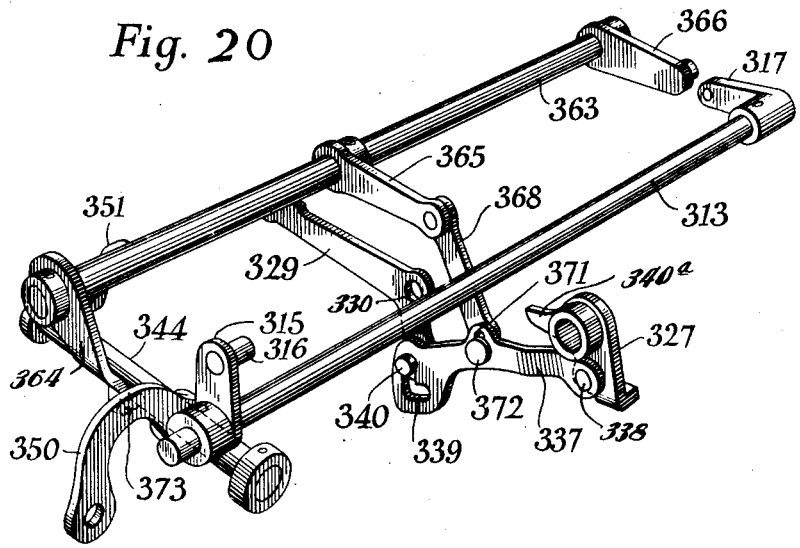
Fig. 20 is a detail perspective view of the parts removed from the supporting bracket of Fig. 16.

Means are provided for controlling the setting of the stops 120 progressively, from left to right, by the number keys 25 of successively higher values, beginning with the value 1 key, whereby each stop, when set, has a position in the series representative of the value of the related number key. Said controlling means preferably takes the form of key-operated mechanism for tripping the stop setting slide levers 126 from their latched positions, as follows:

Intermediate the stop setting slide levers 126 and the key levers 28, 29, and slightly in advance of the former, are individual rock shafts 134 for the several stop setting slide levers 126 (see Figs. 2 and 13). The shafts 134 are suitably journaled in hangers 134', (Fig. 2), secured to the inclined front edge of the top plate 96 of the carriage transversely thereof in two groups, of five parallel shafts each, located on opposite sides of the center of the carriage, in end to end, spaced apart relation, with a single short shaft located in the space between the groups. This arrangement of the shafts 134 is for the purpose of connecting the widely spaced key levers 28, 29 and the closely spaced setting slide levers 126. The shafts 134 in the left hand group are adapted to operatively connect the 1, 2, 3, 4 and 5 value key levers 28 and the setting slide levers 126 of the first, second, third, fourth and fifth stops 120, respectively. Those in the right hand group are designed to connect in like manner, the 7, 8, 9, 10 and 11 value key levers 28, provided the machine is equipped in the manner and for the purpose previously described; with number keys for values 10 and 11, and the setting slide levers 126 of the seventh, eighth, ninth, tenth and eleventh stops 120. The single short shaft 134 is designed to connect the key lever 28 of the value 6 key with the setting slide lever 126 of the sixth stop 120. The last-named key lever and setting slide lever are in the center of the machine, and the before-described space between the groups of the other shafts has been provided in order that a direct connection may be made between the key lever 28 of the 6 key and its corresponding stop-controlling slide lever 126.

Connections between the numeral key levers 28 and the shafts 134 are provided, (see Figs. 2, 4, 5 and 11 to 13), in the form, preferably, of a rearwardly projecting crank arm 135 fast on each shaft 134 in substantially the same vertical plane with its related key lever 28. Each crank arm 135 has a pendent link 136 pivoted thereto, as at 137, to swing lengthwise of the related key lever. Each link 136 is provided with a stud 138 adapted, when the link is swung forwardly, to enter a rearwardly opening recess 139 in a vertical horn 140 on the related key lever 28, and thus connect the shaft 134 to its key lever to be rocked thereby. Springs 141 connecting the crank arms 135 and their respective floating links 136, normally hold the free ends of the links rearwardly to disengage the studs 138 from the recesses 139, and maintain the number keys 25 disconnected from the stop control mechanism. Operating cranks 327, arrest the floating links 136 at their rearward limits, and control the connections between the number keys 25 and the stop control mechanism, as hereinafter explained.

Fast upon each shaft 134, except that of the short shaft related to the 6 key, and in substantially the same vertical plane with its related setting slide lever 126, is a rearwardly extending tripping arm 142 (Figs. 3, 4 and 11 to 13), having pivoted thereon for movement lengthwise of its slide lever 126, a tripping dog 143 extending upwardly in front of the stop bar 132 and undercut on its rear edge to provide a hook portion 144 adapted to engage a tripping lug 145 on its related stop setting slide lever 126. A spring 146 suitably connects each tripping dog 143 and arm 142 to urge the dog rearwardly against the stop bar 132 and permit yielding movement of said dog in counter-clockwise direction for a purpose to be explained. In the case of the short shaft 134, related to the 6 key, no tripping arm 142 is required since the related setting slide lever 126 is directly above said shaft. Hence, an angular tripping dog 143, similar to the others, is pivotally mounted at its elbow directly on the crank 135 of said shaft and urged in the proper direction by a spring 146 suitably connected to the tail of the angular dog and to the crank. In their forward positions, and in the normal positions of the setting slide levers 126, the tripping dogs 143 hook rearwardly over the lugs 145 so that downward movement of said arms and dogs will pull the setting slide levers 126 downwardly and thus trip them from their normal latched positions for sliding movement rearwardly by the motor springs 130 to set the stops 120.

*Stop controlled value selecting gearing*

Above the stops 120 is a selector gear 147, (Figs. 2 and 9), upon a squared intermediate section 148 (Fig. 9), of a register drive shaft 149, for lateral advance and retraction thereon transversely of the stops 120, and for rotation by said shaft. The register shaft 149 extends clear across the carriage and is journaled in the brackets 95, and the side plates 78 of the crossfooters 75 and 76, with its opposite ends projecting into the crossfooters for driving connection with respect to the master wheels thereof.

A selector gear shuttle carriage 150, (Figs. 2, 9, 10 and 11), is mounted upon transverse guides 151, and connected to the grooved hub of the gear 147, (Fig. 9), to advance and retract the selector gear over the stops 120. The shuttle carriage 150 slides on one guide 151, having its ends fixed to the sub-frame side walls 121, and is fixed to another guide 151 sliding in said side walls to provide an adequate bearing for said carriage. A stop lug 152, (Figs. 2 and 11 to 13), depends from the gear shuttle carriage 150 to be intercepted, in the effective, or set positions of the stops 120, by the stop arms 123, whereby axial advance of the selector gear 147 is limited in different degree to set the gear to different positions along the register drive shaft 149 according to the values of the keys depressed.

A motor spring 153 connected at its opposite ends to the selector gear shuttle carriage 150 and to a fixed part of the machine, advances said gear shuttle carriage and gear.

The selector gear shuttle carriage 150, and hence the gear 147, are adapted to be held, against the tension of the motor spring 153, in a normal position slightly to the left of the left hand stop 120, by a shuttle carriage latch 154, (Figs. 2, 9–11 and 13), pivoted on bearings 155 in the sub-frame side walls 121, to swing vertically, against the tension of a suitably connected spring 156, (Fig. 3), from a latching position in front of a tapered roller 157 on said shuttle carriage 150 into an unlatching position above the roller.

A combined latch-releasing and stop-resetting bail 158 is pivoted for vertical rocking movement on a shaft 159, extending between the sub-frame side walls 121 parallel with and in front of the shaft 119. The bail 158 includes a bail bar 160 overlying the resetting arms 124 of the stops 120, whereby it is operatively related to said stops 120 for elevation by movement of the latter to effective position, and for depression to reset said stops 120 to ineffective position. A slotted link 161, (Figs. 3 and 10), connects said bail 158 with the shuttle carriage latch 154 so that the latter is moved to unlatching position by elevation of said bail and permitted to assume latching position under the urge of the spring 156 upon depression of the bail. In this connection, it is to be noted that the above unlatching operation is effected, primarily, by operation of the stop setting mechanism, to wit, the slide levers 126, stops 120 and motor springs 130, in properly timed relation to movement of the stops to their fully effective positions.

Operatively related to the axially shiftable selector gear 147, is a differential member 162, (Figs. 1 and 2), having graduated teeth or flights 163 arranged to engage the selector gear 147, in the different set positions of the latter, so that different numbers of teeth or flights 163 corresponding to the value of the number key 25 depressed, will engage the selector gear 147 to turn the latter differentially. In one aspect, the differential member 162 forms part of the value selecting mechanism. In another, it forms part of a general operator unit to be described, by which, as will presently more clearly appear, said gear 147 is rotated differentially according to the values of the keys 25. It will, of course, be understood that in the normal position of the selector gear shuttle carriage 150, the selector gear 147 is out of mesh with the differential member 162. It will be noted that eleven teeth 163 have been illustrated in furtherance of the machine's adaptation to English currency work, but it will be understood that, in computing according to the decimal system, the first nine teeth 163 only will be utilized.

OPERATING MECHANISM

*General operator*

The rotatable differential member 162 is mounted on a general operator unit 164, (Figs. 1, 2, 8 and 11 to 13), including a sleeve 165 (Fig. 8), having at one end a clutch housing 166. Secured upon the sleeve, and connected as by tie rods 167 and spacing collars 168, are the aforesaid differential member 162 and a series of cams 169, 170, 171 and 172, (Figs. 5 and 8), presently to be explained. The general operator 164 is journaled, as by bushings 173, on a general operator shaft 174 to be driven by the shaft, through the clutch 166, as hereinafter explained. The shaft 174 extends across the carriage 16, through bushing members 175, (Fig. 8), in the brackets 95, with its ends terminating adjacent the inner ends 78 of the crossfooters 75 and 76. The opposite ends of the general operator shaft 174 are journaled in sleeves 176, rotatably mounted in anti-friction bearings 176' supported in brackets 177 arising from the carriage top plate 86.

The general operator shaft 174 is driven in clockwise direction, looking from the right, by an electric motor, through an inclined jack shaft 198 operatively connected at its upper end to the general operator shaft 174 by beveled gears 199 and 200 fast on said shafts, respectively, the elongated sleeve of the beveled gear 199 fast on the jack shaft, being journaled for support in one of the before-mentioned bushing members 175 projecting from one of the brackets 95.

*Main drive control*

Referring particularly to Figs. 2, 4 and 11 to 13, the motor control bail 206 underlying the fingers 129 of the stop-setting slide levers 126, is pivoted on the carriage 16, as at 207, to the brackets 95, and urged upwardly by a spring 208, (Fig. 4), suitably fixed at its opposite ends to said bail 206 and to one bracket 95. As will be obvious, said bail 206 urges the forward ends of the stop setting slide levers 126 upwardly against the stop bar 132, the bail being depressed by said slide levers when the latter are tripped from their latched positions, and being locked in depressed position by said tripped slide levers incident to the rearward travel of the depressed slide lever under the influence of its spring 130, which results in shifting the shoulder 133 of the slide lever beneath the stop bar 132, to prevent upward movement of the slide lever. Adjacent one side of the bail 206 and operable thereby is a normally open circuit making and breaking device in the form of fixed and movable contact members, not shown, which controls the supply of power to the motor.

We have seen, in the foregoing, that depression of a value key 25 first trips the stop setting slide lever 126, of a related stop 120, from its normally latched position for operation of said slide lever by its motor spring 130 to set the value stop 120 from an ineffective to an effective position in the path of the selector gear shuttle carriage 150, and that, in view of the described relation of the stop setting slide levers 126 to the motor control bail 206, and the control of the supply of power to the motor 178, by the bail, the motor is energized to rotate the general operator drive shaft 174 coincidently with the setting of the value stop 120 to effective position. It will also be clear that another result is effected substantially coincidently with the setting of a stop 120, namely, the stop resetting bail 158, 160 is operated to release the latch 154 of the selector gear shuttle carriage 150, whereupon the latter is propelled by its motor spring 153 so that the lug 152 thereon collides with and is intercepted by the set stop 120.

We next come to the driving connections between the general operator unit 164 and the general operator drive shaft 174, and the control of such connections.

*Drive from general operator shaft to general operator unit*

Figure 3:
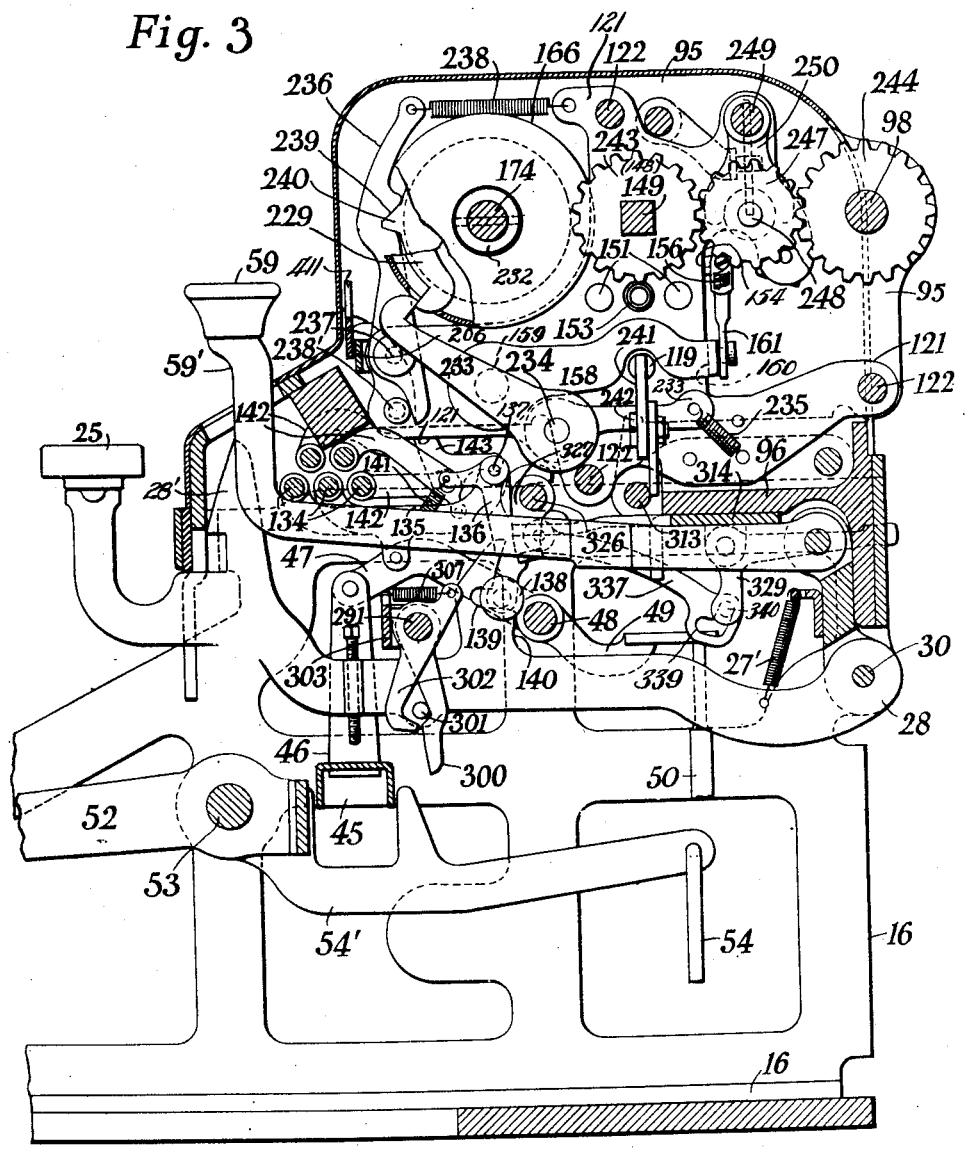
Figure 8:
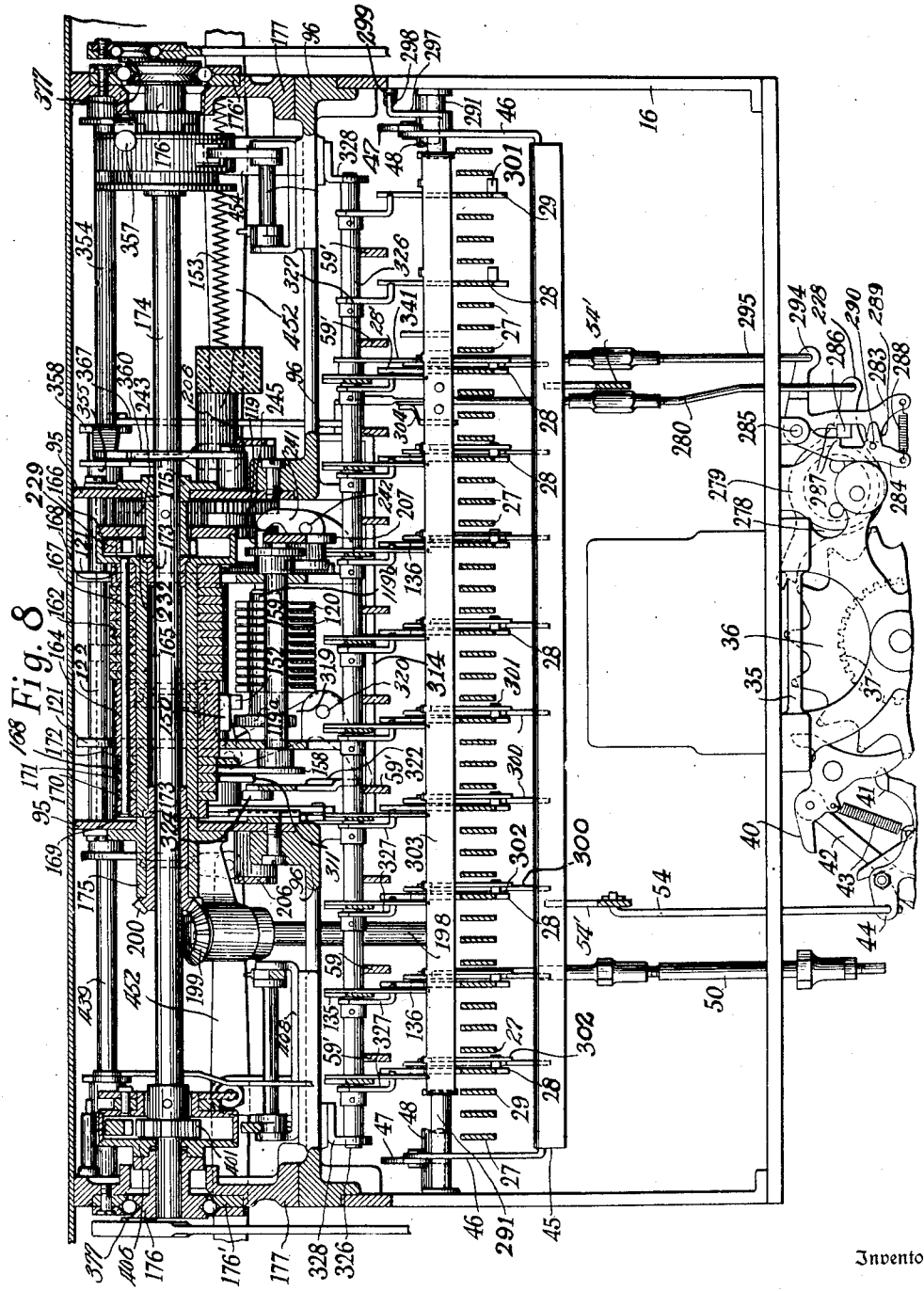
Fig. 8 is a transverse vertical sectional view, taken on line 8—8 of Fig. 2.

The general operator unit 164 is driven by the general operator drive shaft 174 through a single cycle of movement as an incident to depression of each value key 25, as follows: Referring particularly to Figs. 3, and 8, there is associated with said unit 164 a single revolution, general operator clutch, including a clutch dog 229 pivoted in the clutch housing 166 and urged by a spring to engage a ratchet wheel 232 fast on the general operator drive shaft 174. The tail of the clutch dog 229 projects through the housing 166 for engagement, in the normal position of the general operator unit 164, with a hooked clutch tripping arm 233 mounted on a fixed stud 234 to be rocked into either tripping or releasing position relatively to the dog 229, whereby the clutch is engaged or disengaged, as will be clear. A suitably connected spring 235 yieldingly retains the tripping arm 233 in tripping position and the clutch normally disengaged. The general operator unit 164 is yieldingly held in normal position at the end of each revolution, by a detent lever 236, (Fig. 3), pivoted, as at 237, and urged by a suitably connected spring 238 in a direction to engage a notch 239 in said lever with a tooth 240 on said unit. A stop 238' projecting from the adjacent sub-frame wall 121, limits movement of the detent lever 236 in a direction to prevent the latter from binding against the general operator unit 164.

The above-described clutch drive to the general operator unit 164 is controlled, preferably, by the value selecting mechanism, so that said unit is held locked out against rotation, through disengagement of the clutch elements, until after a value selection has been effected. In other words, the control is such that value selection is a condition precedent to rotation of the general operator unit 164. This is for the purpose of preventing premature operation of the registers 63, 75 and 76 which, as will presently be seen, are driven by rotation of said general operator unit to accumulate the selected values.

As previously mentioned, the stop carrying shaft 119, (Figs. 2 and 11 to 13), is endwise movable in limited degree in the sub-frame side walls 121. Hence, the impact of the selector gear shuttle carriage 150 against a set stop 120 will impart limited advance movement to said shaft 119, i. e., toward the right, looking at the front of the machine. A clutch control lever 241, (Figs. 3, 8 and 9), is pivoted, as at 242, to an ear projecting from one sub-frame wall 121 for operation by the stop shaft 119, on its advance, to move the general operator clutch tripping arm 233 to releasing position and thus free the clutch dog 229 for engagement with the clutch ratchet 232. Retraction of the stop shaft 119 by the shuttle carriage 150, as it returns to its normal position, permits return of the clutch tripping arm 233 by its spring 235 to tripping position to disengage the clutch dog 229 at the end of a single rotation of the general operator shaft 174. The spring 235 assists the shuttle carriage 150 in axially returning the stop carrying shaft 119 and its stops. The collar 119ª, (Figs. 8 and 9), is located on the shaft 119 for engagement by the selector gear shuttle carriage 150, so that when the latter is retracted, the shaft 119 and value stops 120 will be also retracted from the positions to which they were moved by the selector gear shuttle carriage on its collision with the set value stop 120.

Drive from general operator to register drive shaft and registers

It will be understood from the foregoing, the general operator unit 164 rotates the register drive shaft 149 through the medium of the differential member 162 on the former and the selector gear 147 on the latter. Operatively connecting the register drive shaft 149 and the shaft 98 of the column register master wheel 97 is a reversible gear drive similar to that featured in my U. S. Patent No. 1,421,201 of June 27, 1922. Briefly, (see Figs. 3 and 8 to 10), said drive includes gears 243 and 244 fast on the shafts 149 and 98, respectively, a twin gear 245 mounted on a stud 246 projecting laterally from one bracket 95, and a reversing gear 247 mounted between said bracket 95 and the sub-frame wall 121 upon a shaft 248 and laterally shiftable to "add" or "subtract" positions, respectively, in one of which the master wheel shaft 98 is rotated in a direction to effect addition in the column registers 63, and in the other of which, the direction of rotation of said shaft 98 is reversed to effect subtraction in said registers 63. A gear shifter rod 249, (Figs. 3 and 10), having a yoke 250 depending therefrom to engage a grooved hub 251 on the reversing gear 247, is mounted to slide in one bracket 95 and the adjacent sub-frame wall 121 to shift said reversing gear 247. A spring 252 is suitably connected to the gear shifter rod 249 and to the other bracket 95 to yieldingly hold the reversing gear 247 normally in "add" position. Means to shift the rod 249 is shown in the original Patent No. 2,145,254, January 31, 1939, and forms no part of the present invention.

The crossfooter registers 82 are driven by the register drive shaft 149 through gear trains substantially the same as above described.

Escapement and key locking mechanism

To prevent lateral displacement of the carriage 16, and hence movement of the master wheels from selected denominational location during an accumulating operation, it has been found advisable to lock the escapement of the machine at the beginning of a cycle of operation and to maintain it locked until accumulation has been completed. To this end, there is provided locking mechanism automatically operative under control of the value keys 25 to lock the escapement upon initial depression of said keys, and to maintain it locked until said keys have returned to normal position, including key locking mechanism to prevent premature return of the depressed key, and means for automatically releasing both the escapement and said key locking mechanisms at the end of an accumulating operation.

Figure 12:
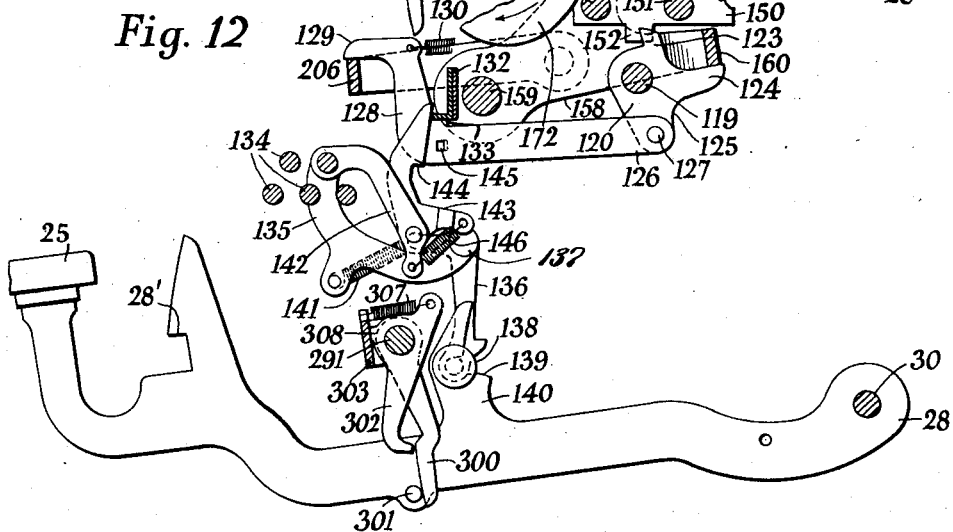
Fig. 12 is a similar view, with parts omitted, showing the positions assumed upon the depression of a value or numeral key.

The escapement locking mechanism, (see Figs. 2, 3, 4, 7, 8, 11 to 13, 14 and 15), includes an escapement locking pawl 278, (see Fig. 8), cooperating with the escapement wheel 36 and mounted on a bracket 279, depending from the base of the carriage 16, to rock into escapement locking and unlocking positions, respectively. A vertical pawl-operating rod 280, (see also Fig. 4), is connected at its lower end to said pawl 278. A spring 281 has its opposite ends secured to said rod and to a fixed stud 282 in the bracket 95, respectively, to urge said rod upwardly to shift the locking pawl 278 toward escapement locking position. Cooperating with the escapement locking pawl 278 is a pair of opposed main and auxiliary latching members 283 and 284, respectively, pivoted on a stud 285, supported beneath the carriage 16, to swing into and out of their latching positions on opposite sides of a latch lug 286 on said locking pawl 278, each member 283 and 284 having a latching shoulder 287, the latching shoulders being opposed and one being higher than the other. These latching shoulders are adapted, in the latching positions of said members, to take over said lug 286 to maintain the escapement locking pawl 278 in unlocking position. A spring 288 connects said latching members 283 and 284 to urge them toward each other and hence, toward latching position, but permitting their relative separation for a purpose presently clear. Cooperating stops 289 and 290 on said latching members, respectively, limit their movement toward each other. The arrangement of the latching shoulders 287 is such that in the latching position of the main latching member 283, the auxiliary latching member 284 is blocked, both by contact of its latching shoulder 287 with the side of the latch lug 286, and by the stop 289 of the main latch 283 contacting the stop pin 290 of the auxiliary latch, against movement to latching position. The stops 289 and 290 are so arranged that the main latching member 283, by its movement to latching position, will displace the auxiliary latching member 284 from latching position. The purpose of the described construction of the main and auxiliary latching members will hereinafter be explained. Normally, the main latching member 283 is normally effective to maintain the pawl 278, in escapement unlocking position, the main latching member being trippable by latch operating mechanism to release the pawl 278, as follows:

Suitably mounted in the carriage 16 to extend transversely thereof, over the number key levers 28, is a latch-operating rock shaft 291, (Figs. 2, 3, 4, 6, 7 and 11–15). A rearwardly projecting crank arm 292, (Figs. 4, 7 and 15), having a bifurcated end 293 is fast on said shaft 291. Pivoted at 294, (Fig. 8), to the main latch member 283 is a latch-releasing rod 295 having a stud 296, (Fig. 4), thereon for engagement and disengagement with the bifurcated free end 293 of the crank arm 292, whereby said rod may be connected to or disconnected from said crank arm 292 by swinging movement of said rod. In their connected relation, said crank arm 292 and rod 295 provide for swinging said main latching member 283 into latching and unlatching positions relatively to the escapement locking pawl 278, by rocking movement of said shaft 291 in opposite directions, respectively. The purpose of disconnecting said crank arm 292 and rod 295 will be presently explained. A second crank arm 297, (Figs. 6, 7 and 8), fast on the right hand end of the rock shaft 291 is connected by a spring 298 to a fixed stud 299, so that said shaft is yieldingly urged in a direction to swing the main latching member 283 to latching position. Fast on and depending from the rock shaft 291 is a series of cam arms 300, (Figs. 2–4 and 11–15), one for each value key lever 28, the cam arms lying alongside said key levers 28, and operated, upon initial depression of said key levers, by rounded studs 301 on the key levers, to rock said latch-operating shaft 291 in counter-clockwise direction, (Fig. 15), against the tension of spring 298, whereby the main latching member 283, (Fig. 8), is swung to unlatching position and maintained in such position until the return of the depressed key lever to normal position. The normal position of the cam arms 300 and rock shaft 291 is shown, for instance, in Figs. 2, 3, 11, 14 and 15, and the manner in which they are affected by depression of the value keys 25 is shown in Figs. 12 and 13.

Loosely mounted on the latch-operating rock shaft 291 is a series of key locking fingers 302 adapted to be swung on said shaft from a normal ineffective position to an effective position over the studs 301 to block return of the number key levers 28. Also swinging on said shaft 291 is a finger-operating bail 303 adapted to be rocked from normal position to move said fingers 302 to effective position and to return the latter to ineffective position by its movement back to normal. A bail-operating arm 304, (Figs. 7, 8 and 14), on said bail is connected by a compensating pin and slot connection 305 and 306, respectively, to the aforesaid pawl-operating rod 280 of the escapement locking mechanism, whereby when the latter is operated to escapement-locking position, by its spring 281, the bail 303 is moved from normal position, in counter-clockwise direction (Fig. 2) to free the key-locking fingers 302 for movement into their effective positions. Springs 307 connecting the fingers 302 and said bail 303, and shoulders 308 on said fingers bearing against said bail, establish a yielding operating connection between the bail and fingers. The finger-operating bail 303, as it rocks counter-clockwise, tensions all the springs 307 which thereupon rock their respective key-locking fingers 302 counter-clockwise so that the flattened, horizontal face on the bottom of that finger corresponding with the depressed key 25, will be introduced into the path of return of the stud 301 of the depressed key (as shown in Fig. 12), to prevent complete return of the key until other machine functions have occurred. Simultaneously, the remaining locking fingers 302 associated with the undepressed keys rock to fit their rear or inner concave edges about the studs 301 of such undepressed keys to lock them against depression. After the entry of the digit value of the depressed key 25 has occurred, the cam 171 driven by the general operator shaft 174 wipes past the arm 311 (Figs. 5 and 14), of the bell crank 311, 312 to rock the bell crank counter-clockwise and with it the shaft 313 and arm 317, against the tension of the spring motor 281.

This rocking will, in turn, impart a vertical downward thrust to the link 280 (Figs. 4 and 8), which, because of its connection through arm 304 with the finger-operating bail 303, restores the latter in clockwise direction to its normal position. As the bail is restored to normal, its inner face contacts abutments 308 (Figs. 2 and 13), formed on the upper ends of the respective key-locking fingers 302 to rock the latter clockwise out of the paths of the studs 301 on the keys 25.

At this point, it may be explained that the machine is also equipped with suitable means with which the upstanding lugs 28' of the levers 28 cooperate, for instance, that shown in my U. S. Patent No. 1,811,227 of June 23, 1931, for preventing depression of more than one value key at a time, and also with full stroke mechanism of the type of my Patent No. 1,576,960 of March 16, 1926. However, it has not been considered necessary to illustrate and describe these features in the present instance, since their operation is well-known and they form, per se, no part of the present invention.

The escapement-locking and key locking mechanisms are automatically unlocked by releasing mechanism common to both, including the before-mentioned cam 171, (Fig. 14), of the general operator unit 164. A rocker member 309, (see also Fig. 5), mounted on a fixed stud 310, and comprising two arms 311 and 312, respectively, is positively rocked, in one direction, at the completion of an accumulating operation, by wiping contact of the cam 171 with the arm 311. Such movement of the rocker member 309 is imparted to the pawl-operating rod 280 to move the escapement locking pawl 278, (Fig. 8), to unlocking position where it is held by the latch member 283. For this purpose, a rock shaft 313 is journaled in the opposite flanged ends of a bracket 314, (Figs. 5, 7, 9 and 16 to 20), secured to the carriage top plate 96. A crank arm 315, (Fig. 14), is fixed on one end of the shaft 313 and operatively connected at 316 to the arm 312 of said rocker member 309. A second crank arm 317 is fixed on the other end of said shaft 313 and connected to the rod 280 at 318. Since the finger-operating bail 303 of the key locking mechanism is connected at 305, 306, in the manner previously described, to the escapement locking mechanism, it will be seen that the key locking fingers 302 are moved to ineffective position, to release a depressed key lever 28 simultaneously with the release of the escapement mechanism by the operation of the cam 171 on the arm 311. Obviously, the immediately following return movement of said key lever 28 under the action of its spring 27', withdraws its stud 301 from the high point of the cam arm 300, thus releasing the cam arm, its shaft 291 and the rearwardly projecting arm 292 to the action of the restoring spring 298, (Fig. 8).

The restoring spring thereupon rocks the shaft 291 with its several cam arms 300, and forked arm 292 clockwise, (Fig. 15), to their normal positions, the arm 292 by reason of its connection 293, 296 with the vertical latch rod 295, operating to depress the latter and forcibly return the main latch 283 to effective position.

It may sometimes happen that the operator, by neglecting to remove his finger from a value key, will hold the main latching member 283 in unlatching position during or after the automatic release of the escapement and value keys 25. In this event, the auxiliary latching member 284 will function under stress of the connecting spring 288 to latch the pawl 278 in escapement unlocking position, that is, in its raised, idle position, as soon as it is rocked to such position by the action of the cam 171 on the arm 311 and connected train, until the operator removes his finger, whereupon the main latching member 283 will displace the auxiliary member 284 and assume latching position under the urge of the spring 298.

Figure 5:
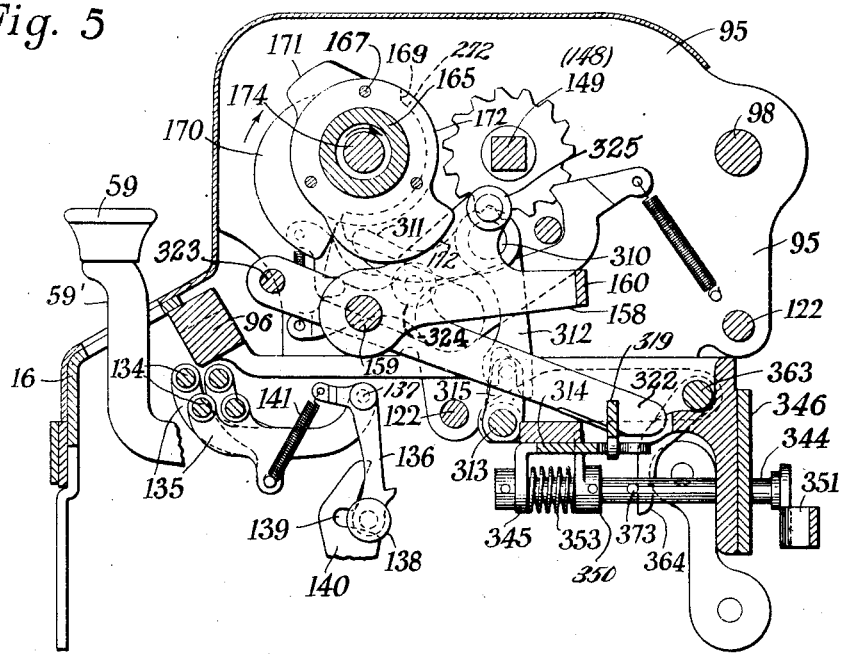
Figs. 5 and 6 are fragmentary longitudinal sections, on respectively different vertical planes parallel with that on which Fig. 2 was taken.
Figure 6:
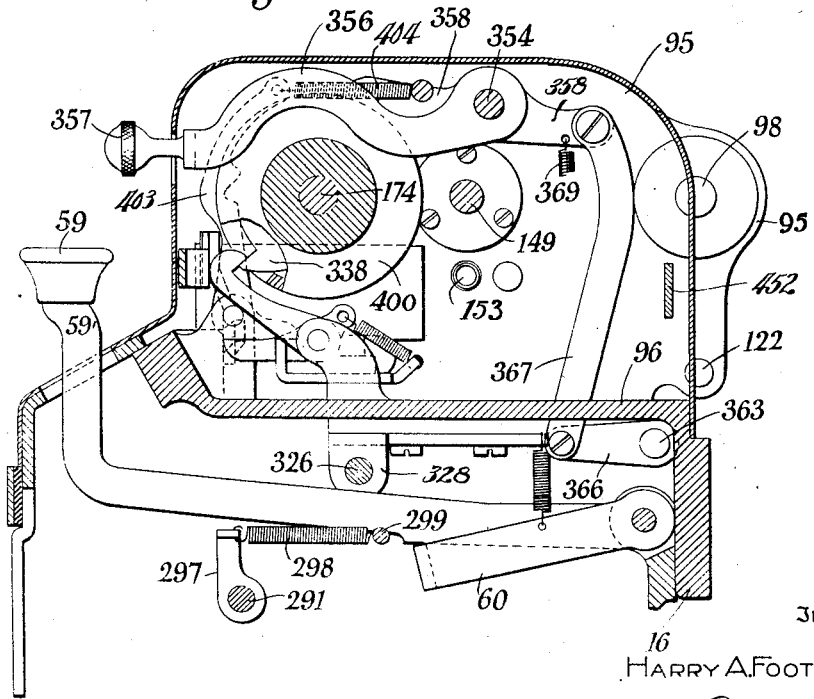

In Fig. 2, the normal angular positions of the teeth 163 on the general operator unit 164 are shown, and in Figs. 5 and 14 is shown the normal position of the cam 171 on the general operator unit, from which it will be clear that the automatic release of the escapement and key locking mechanisms, by the cam 171, follows closely upon the completion of effective operation of the selector gear 147 by the differential member 162 of the general operator unit 164, and hence, closely following the accumulating operation soon after the general operator shaft has completed a half cycle.

Upon reference to Fig. 13, it will be seen that immediately following the release of a depressed value key 25, said key is free to return. Likewise, the before-described mechanism operated by said depressed key for tripping the related stop-setting slide lever 126 is free to assume normal position, as shown, for instance, in Fig. 11, so that when said stop-setting slide lever 126 is returned to normal, the said tripping mechanism will again be in tripping position. The tripped stop-setting slide lever 126 is returned to normal at another point in the same cycle of operation of the machine.

Selector gear retracting mechanism

The selector gear 147 is next automatically returned to its previously described normal position, by mechanism which retracts the selector gear shuttle carriage 150. This mechanism, (Figs. 5, and 8 to 10), includes the before-mentioned cam 170 of the general operator unit 164, a shuttle carriage retracting bell crank lever 319 pivoted at 320, to one of the sub-frame side walls 121, and having one arm connected to the shuttle carriage 150 by a link 321, and an operating connection between the lever 319 and the cam 170, in the form of a lever 322, (Fig. 5), pivoted at one end, as at 323, to one of the sub-frame side walls 121 with its opposite end overlying an arm of the retracting bell crank 319. A roller 324 on the lever 322 provides an anti-friction bearing wiped by said cam 170. The relation of the above described parts of the selector gear shuttle carriage retracting mechanism is such that the lever 319 is moved beyond normal position, to an overthrown position, to momentarily retract the selector gear shuttle carriage 150 to its overthrown position. Such overthrow retraction of the selector gear shuttle carriage 150 accomplishes two things. First, it provides for a clearance between the roller 157, (Fig. 11), on the shuttle carriage, and the latch 154, while the latter is swinging into latching position in front of the former to insure the return of the latch to effective position. Secondly, the before-mentioned stop lug 152, (see Fig. 9), on said shuttle carriage 150 engages the collar 119a on the stop shaft 119 during such overthrow retraction of said shuttle carriage 150, and retracts said shaft positively to its normal position from its advanced position previously described. Such retraction of the stop shaft 119, as has been previously explained, permits return of the tripping lever 233, (Fig. 3), by the spring 235 to a position to disengage the clutch dog 229 on the housing 166 of the general operator unit 164 from the general operator shaft 174. The tripping lever spring 235 also restores the bell crank 241 to its normal position. The cam 170 is arranged to retract the selector gear shuttle carriage 150 and release the clutch dog 229 to effect a single revolution of the general operator unit 164 for each digit value selection set up in the machine.

Stop resetting mechanism

Returning now to the before-described combined latch-releasing and stop-resetting bail 158. Said bail, in addition to its latch-operating function previously described, forms part of an automatic stop resetting mechanism, including the cam 172, (Fig. 5), of the general operator unit 164. In the set position of a stop 120, the bail 158 is swung on its shaft 159 to an elevated position, shown in Figs. 12 and 13, by the set stop, as has been described in the foregoing. As a final operation in the cycle of movement of the general operator unit 164, the cam 172 engages a roller 325, (Figs. 5 and 13), mounted on said bail 158 in the path of said cam 172, and depresses the bail to its normal position shown in Figs. 2, 3, 5, and 10 to 13. The bail 158, in turn, through its engagement with the resetting arm 124 of the set stop 120, resets said stop to normal position, as will be clear. As an incident to the resetting of the stop 120, the related stop setting slide lever 126 is slid forwardly to disengage its latching shoulder 133 from beneath the stop bar 132, thereby releasing the motor control bail 206 to the action of its spring 208, which thereupon rocks the motor control bail from its depressed, circuit closing position to circuit breaking position to stop the motor 178. Such movement of the motor control bail 206 also urges the stop setting slide levers 126 upwardly so that the latching shoulders 133 will be engaged with the stop bar 132 by the springs 130.

Automatic key connecting and disconnecting mechanism

As has been previously explained, the number keys 25 are normally disconnected from the stop controlling mechanism because the springs 141 normally hold the connecting links 136 in their key disconnecting positions, (Fig. 2). This, as will be understood, is to provide for independent use of the typewriting mechanism when writing without computing. The links 136 and springs 141 may be controlled for automatically connecting the keys 25 to the mechanism for tripping the stop setting slide levers 126, when the printing point of the machine enters a column in which it is desired to compute, and for automatically disconnecting said keys when the printing point of the machine leaves such a column.

Such automatic control, (Figs. 2, 3, 4, 7, 8, 15 to 17, 19 and 20), includes a key-connecting shaft 326 extending across the key carriage and having fast thereon a series of pendent key-connecting cranks 327 opposed to the respective links 136. The shaft 326 is journaled in brackets 328, (Fig. 8), depending from the carriage top plate 96, the shaft being also supported intermediate its ends in a bearing lug 328', (Figs. 7 and 16), projecting from the bracket 314. The shaft 326, when rotated in one direction, engages the lateral lugs on the lower ends of the cranks 327 with the links 136, and swings the latter forwardly against the urge of the springs 141 to thereby enter the studs 138 on the links in the recesses 139 of the key levers 28, and thus connect the latter with the computing mechanism, as will be clear. Movement of the key-connecting shaft 326 in a key-connecting direction is effected by means including a bell crank lever 329, (Figs. 2, 7, 15 and 19), rocking vertically on a stud 330 mounted in ears depending from the bracket 314, one arm of said lever projecting through a slot 331 in the rear wall of the carriage 16 for operation by a key-connecting arm 332, (Fig. 7), pivotally mounted on the back of the carriage 16, which arm 332 is held at one limit of its travel by a spring 333, and operated by a cam 334 on each of the column registers 63 in a manner similar to that shown in my U. S. Patent No. 1,512,282, dated October 21, 1924.

The key-connecting arm 332 and cam plate 334 are operated in conjunction with a letter space lock mechanism, including a dog 335 adapted to engage a series of teeth on the upper face of the cam 334, as fully explained in the U. S. Patent No. 1,183,280, issued to W. L. Dench, May 16, 1916, to which attention is invited.

Suffice it to explain herein that the key-connecting arm 332 is depressed by the cam 334 against the tension of the spring 333, to rock the bell crank 329 in one direction when the carriage 16 enters a column to be computed, and to release said arm 332 as the carriage 16 moves out of said column, whereupon the spring 333 returns the arm 332 and rocks the bell crank 329 in the opposite direction. A link 337, (Figs. 2, 3, 15 to 17, 19 and 20), is pivoted at its forward end at 338 to one key-connecting crank 327 for rocking movement thereon in a vertical plane, and is provided with an angular slot 339 in its opposite end to accommodate a stud 340 on the bell crank lever 329. The shape of the slot 339 is such that the link 337 may be swung on its pivot 338 for adjustment to two positions, in one of which it will be operated by the bell crank 329 to effect automatic connection and disconnection of the keys 25 and the computing mechanism, and the other of which it positions another arm of the angular slot 339 in line with the stud 340 to enable the stud to idly traverse the slot without communicating motion to the link 337, which, in effect, is thus disconnected from the crank to prevent automatic operation of the key-connecting means. In the disconnected position of the link 337, the springs 141, (Figs. 2 and 3), are free to move the links 136 and the key connecting shaft 326 to key-disconnecting position, and the automatic key-connecting and disconnecting mechanism is disabled. A stop 340ª on one crank 327 contacts one of the before-mentioned tie rods 122 to arrest movement of the links 136 and the key-connecting shaft 326 in their key-disconnecting positions.

Automatic escapement lock connecting and disconnecting means

The escapement locking mechanism is normally rendered ineffective, so that in the independent use of the typewriter mechanism, the latter is controlled by the escapement in the usual manner. Since, however, for the reasons previously stated, it is desirable, when computing, to lock the escapement, the escapement locking mechanism is automatically rendered effective when the printing point of the machine enters a column position in which it is desired to compute, and is again rendered ineffective when the printing point leaves said column, to enable the independent use of the typewriter mechanism beyond said column. Preferably, in the accomplishment of the above results, the latch-releasing rod 295 (Figs. 4, 8 and 15) of the escapement-locking mechanism is operatively connected to the key-connecting shaft 326 through an arm 341 fast on said shaft, a pin 342 on said rod, and a slot 343 in said arm 341, so that when the shaft 326 is in its normal key-disconnecting position, the latch-releasing rod 295 is in a position in which its stud 296 is free from the bifurcated end 293 of the crank 292, and when said shaft is moved to key-connecting position, said rod is swung to locate the stud 296 in the bifurcated end 293, as in Figs. 4 and 20. Obviously, in the first-named position, the latch-releasing rod 295 is disconnected from the latch-operating shaft 291 and the escapement lock is disabled, whereas in the second position of said rod, the reverse is true.

Decimal trip mechanism

The machine of my invention embodies decimal spacing mechanism for automatically causing the carriage 16 to skip over the decimal spaces, as is usual in this type of machine. Said mechanism is substantially the same in certain respects as that disclosed in U. S. Patent No. 820,879, issued to Laganke and Smith, May 15, 1906, and U. S. Patent No. 922,559, issued to H. D. Bolton, May 25, 1909, to which attention is directed. Referring briefly to said mechanism, (Figs. 7, 9, 10, 16 to 18 and 20), horizontally arranged decimal spacing shaft 344 extending fore and aft of the machine, is mounted to rock, and to have endwise movement, in bearings 345 and 346 on the bracket 314 and carriage 16, respectively. An escapement tripping dog 347, (Figs. 9 and 10), is pivoted to an ear depending from the bottom plate of the carriage 16, as at 348, the dog being connected to said shaft 344 by a rod 349 and a crank 350 for operation when the shaft 344 is rocked from normal position to momentarily retard the movement of the escapement spacing dog 40 to effective position, and thus cause the carriage to skip the decimal spaces, as will be understood without further explanation. The shaft 344 is rocked from normal position by means of a decimal trip arm 351, (Figs. 5 and 20), fast on the rearwardly projecting end of the shaft, which arm engages a decimal trip cam 352, (shown in dotted lines in Fig. 7), on the column register 63, located in the path of travel of said arm 351. The decimal trip shaft 344 is adapted for endwise movement to a decimal trip disabling position, in which the decimal trip arm 351 is displaced from its normal path of travel to remain unaffected by said cam 352 in a manner next described. A suitably arranged spring 353, (Fig. 5), tensions the shaft 344 against rocking movement from normal position, and against endwise movement to disabling position.

Means for manually disabling the key connecting, escapement locking, and decimal trip mechanisms Referring particularly to Figs. 4, 6, 8 and 15, a disabling rock shaft 354 extends transversely of the carriage, one end of which is suitably mounted in one of the brackets 177, the opposite end having a step bearing 355, (Fig. 8), projecting from the outer face of the right hand side frame bracket 95. A key lever 356, (Fig. 6), having a disabling key 357, is fixed on the shaft 354 for manually rocking the latter in opposite directions, respectively. A motion-transmitting lever 358, (Figs. 4 and 15), is fast on said shaft 354. Detent teeth 359 on the forward end of the lever 358 engageable by a detent 360 pivoted, as at 361, and tensioned by a suitably connected spring 362, retain the shaft 354 in either of its positions.

Journaled at its opposite ends in the bracket 314 is a motion-transmitting shaft 363, (Figs. 4 to 7 and 15 to 20), having fast thereon three crank arms 364, 365 and 366, respectively. A link 367, (Figs. 4, 6 and 15), connects the crank arm 366 to the lever 358 for movement of the shaft 363 by the disabling shaft 354. A second link 368, (Figs. 2, 7, 15, 19 and 20), connects the crank arm 365 to the link 337 of the before-described automatic key connecting and disconnecting mechanism so that in one position of the key-disabling shaft 354, said link 337 is in a position in which the bell crank 329 is operatviely connected to the latter for automatic connection and disconnection of the number keys 25 to and from the computing mechanism, and in the other position of said shaft 354, the link 337 is swung upwardly into the position in which it is inoperative by said bell crank 329, and the automatic key connecting and disconnecting mechanism is disabled. In this adjustment the numeral keys 25 are disconnected from the totalizer-actuating mechanism, as the springs 141 will rock the links 136 out of the recesses 139, in the horns 140 of the keys. A spring 369 suitably connected to the motion-transmitting lever 358 and to a fixed stud 370, yieldingly retains said shaft 354 and associated parts in the first-described position, so that said key connecting and disconnecting mechanism is normally conditioned for automatic operation. The connection of the link 368 to the link 337 is through a slot 371 and pin 372 to compensate for such automatic operation, as will be clear.

During the operation of disabling the automatic key connecting and disconnecting mechanism, the crank arm 364, (Figs. 5, 18 and 20), on the shaft 363 engages a stud 373 on the decimal trip shaft 344 and moves the latter endwise to the decimal trip disabling position previously described.

We have seen that the latch-releasing rod 295, (Figs. 8 and 15), of the escapement locking mechanism is connected through the arm 341 to the key-connecting shaft 326 so that when the latter is in key-disconnecting position, the escapement locking mechanism is disabled because the main latch 283, (Fig. 8), cannot be shifted from its effective position, by depression of a key lever 28, but continues to hold the escapement locking pawl 278 ineffective. Hence, the disabling key 357, as will be evident, in addition to disabling the automatic key connecting and disconnecting mechanism and the decimal trip mechanism, functions to disable the escapement locking mechanism as well.

The sequence of operations may be gathered from the foregoing, but to facilitate an understanding thereof, the various movements ensuing as a result of depressing and releasing a single key will be detailed, it being remembered that the letter spacing mechanism is not permitted to function, except to take up clearances, until the entry into the registering mechanism of the digit value represented by the key depressed has taken place.

Figure 4:
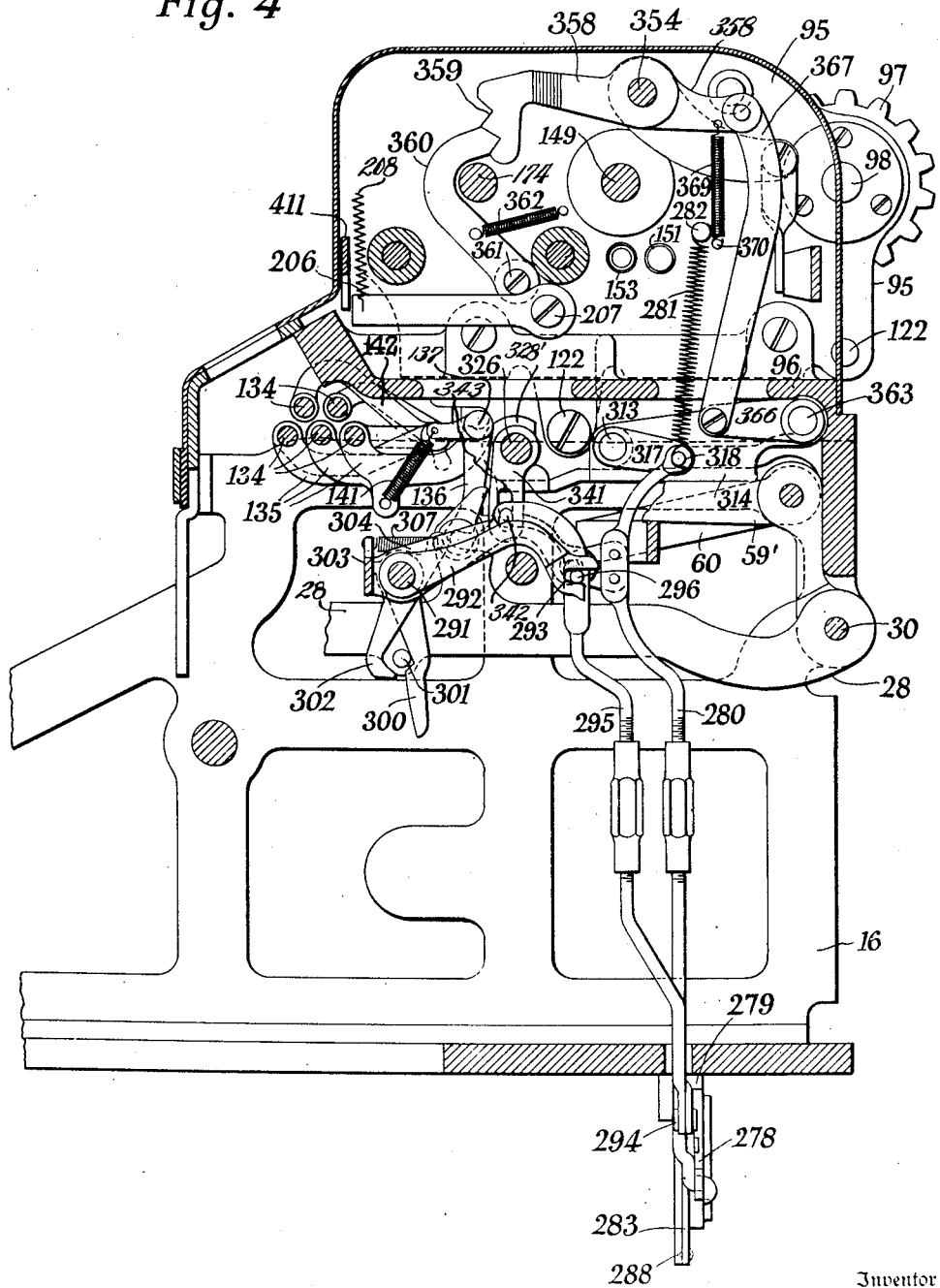

A numeral key 25, (Fig. 2), and its lever 28, at the beginning of a depression stroke, wipes the stud 301 on the lever 28 against the shoulder on the cam arm 300, rocking such arm and its shaft 291, (Fig. 4), and arm 292 on the shaft, against the tension of the spring 298, (Fig. 8). The arm 292 is connected with the vertical latch-disabling rod 295, to release the main retaining latch 283 (Fig. 8), against the tension of its spring 288, thus freeing the escapement locking pawl 278 to the influence of its spring 281, (Fig. 4).

The spring 281, connected to the pawl by the vertical rod 280, immediately rocks the toothed end of the escapement locking pawl 278 into the path of the adjacent tooth of the escapement ratchet 36, (Fig. 8), there being at this time a slight clearance between the toothed end of the escapement locking pawl and the tooth of the escapement ratchet, which is provided to insure the engagement and disengagement of the pawl and ratchet.

Furthermore, the vertical rod 280, (Fig. 14), through which the escapement locking pawl 278 is controlled, on its upward travel under the influence of the spring 281, rocks the key locking control bail 303 counter-clockwise, through the pin and slot connection 305, 306 with the rearwardly extending arm 304 of the bail, the spring links 307 connecting the bail with the individual key locking members 302, operating to press such members against the key lever studs 301.

The locking fingers 302 associated with the undepressed keys 25 move to fit their recessed portions around the studs 301 of such keys.

Simultaneously with the shifting of the escapement pawl to effective position, the spring 281 rocks the arm 317, (Fig. 4), and shaft 313 counter-clockwise, (as the parts appear in Fig. 4), the arm 315, (Figs. 5 and 14), at the opposite end of the shaft 313, rocking the bell crank lever 312, 311, to position the arm 311 in the path of a locking pawl restoring cam 171 fast with the general operator sleeve 165.

It will be noted that the cam 171 must move through a little more than half a rotation before it can act upon the bell crank arm 311.

Coincidently with the foregoing operations, initiated by wiping contact of the key lever stud 301 with the cam arm 300, the recessed horn 140, (Figs. 2 and 11–13), of the key lever 28, through the link 136, arm 135, shaft 134, and arm 142, pulls downwardly the catch 143, and the forward end of the slide lever 126, to disengage the shoulder 133 of the slide lever from the universal stop bar 132.

The nose 129 on the forward end of the slide lever 126, as the latter is rocked downwardly, depresses the bail 206 against the tension of its spring 208, (Fig. 4), to close a circuit through an electric motor (not shown), thus energizing the motor and its connections to the general operator shaft 114.

Figure 9:
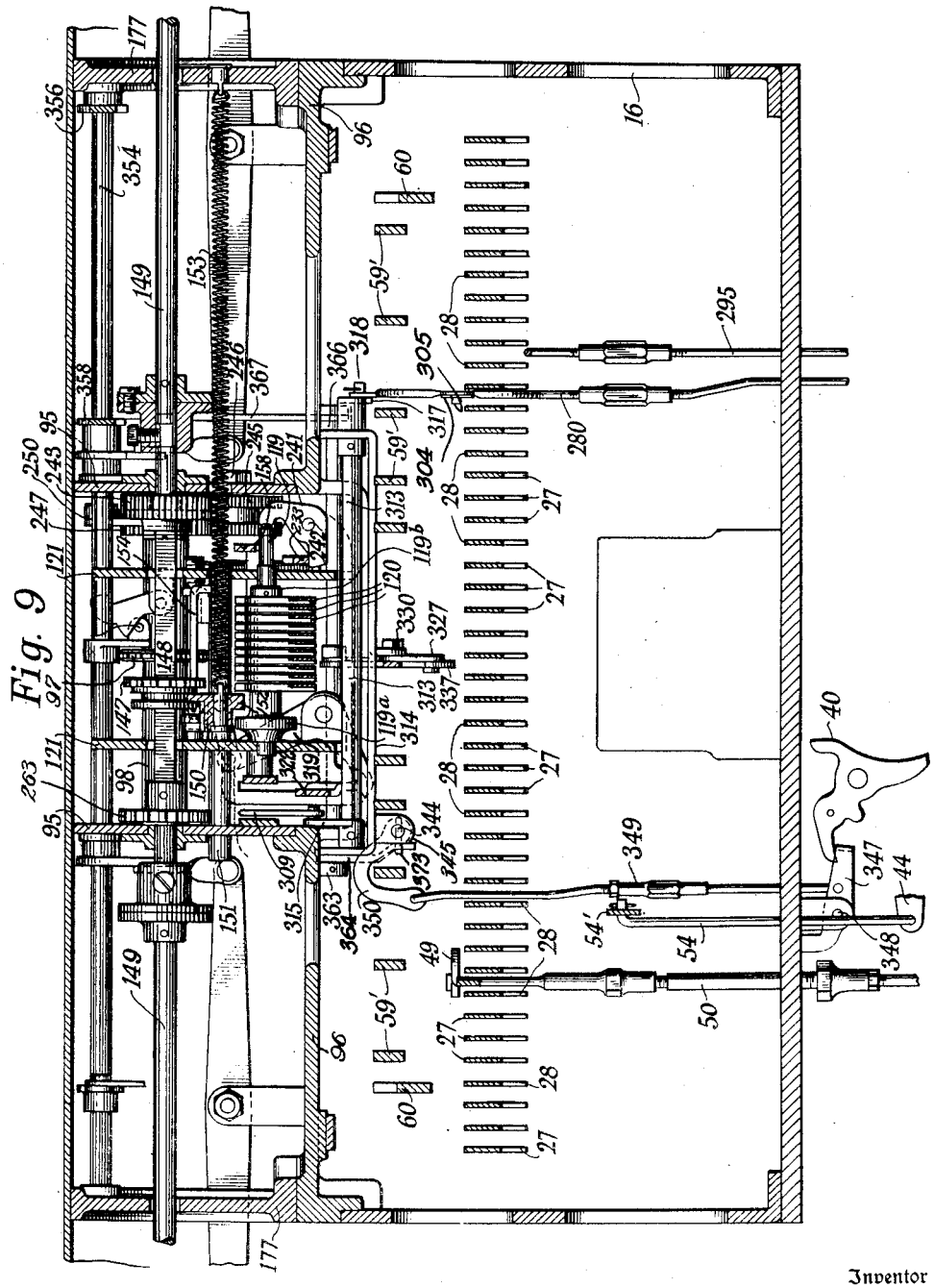
Fig. 9 is a similar view, taken on line 9—9 of Fig. 2.
Figure 10:
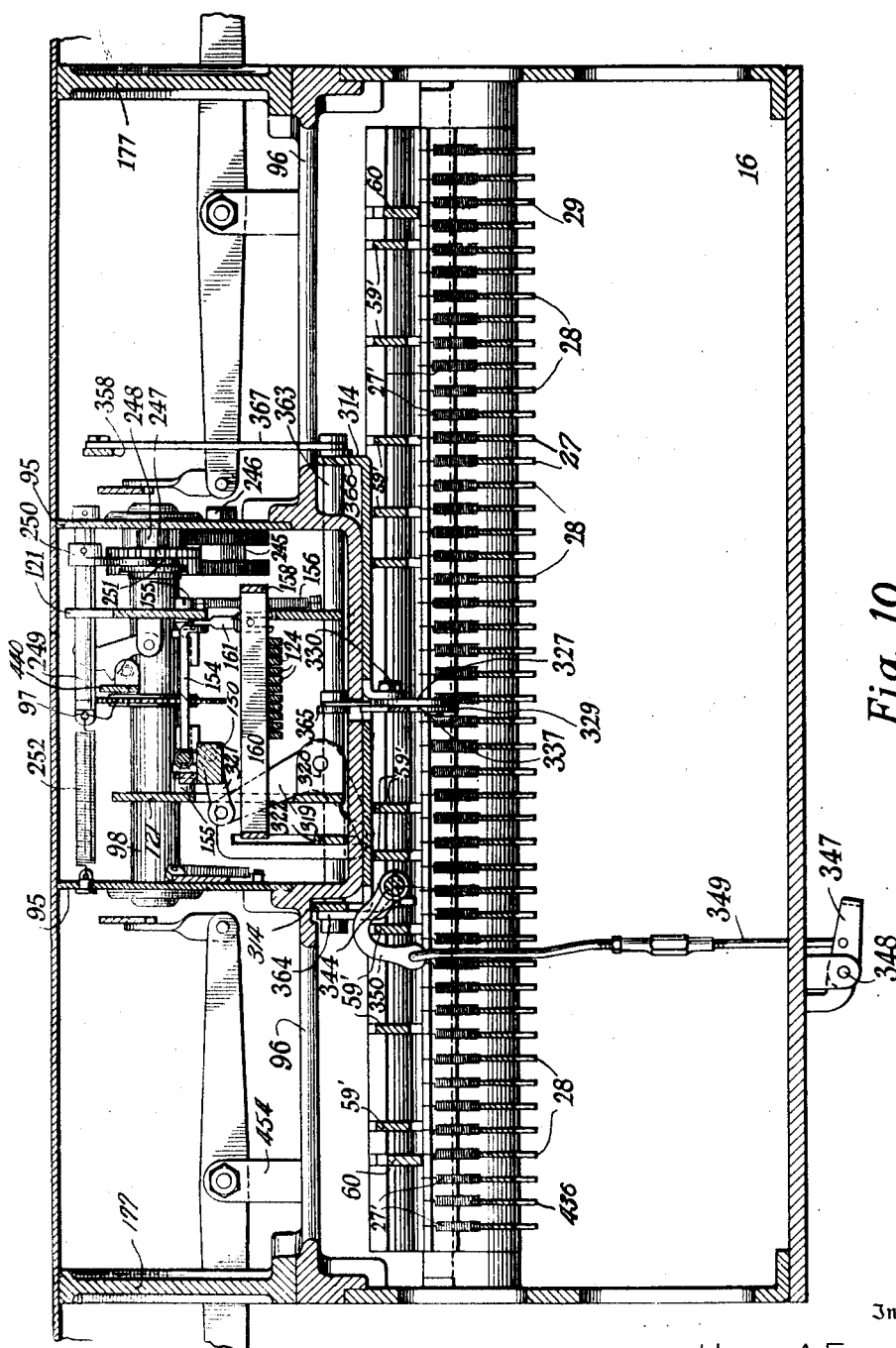
Fig. 10 is a similar vertical transverse section taken on line 10—10 of Fig. 2.
Figure 11:
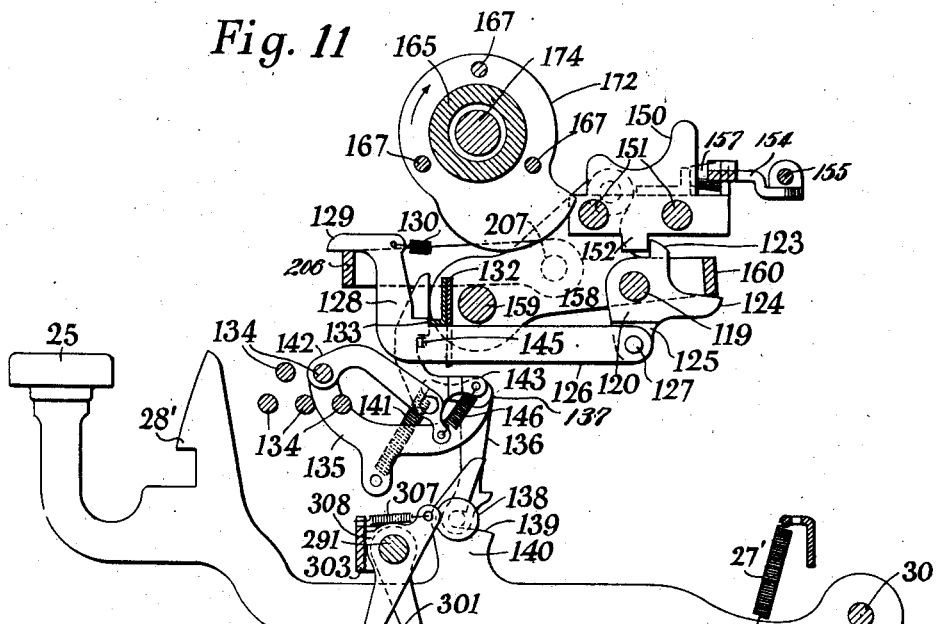
Fig. 11 is a detail side elevation, partly in section, illustrating the normal positions of the parts when a numeral or value key is in control of the accumulating mechanism.

Completion of the motor circuit occurs simultaneously with the disengagement of the slide lever 126 from the stop bar 132, whereupon the spring 130 thrusts the released slide lever rearwardly to rock the selected stop 120 into the path of the selector gear carriage 150 and at the same time, rocks the bail 158, 160 upwardly with its link 161, (Fig. 3), to disengage the latch 154, (Figs. 2, 11 and 13), which frees the selector gear carriage to the action of its spring 153, (Fig. 9).

Thereupon, the spring advances the selector gear carriage 150 with its selector gear 147, (Fig. 2), causing the carriage to sharply impact the set stop 120, such contact, aided by the strength of spring 153, being sufficient to shift the entire series of stops 120 and their shaft 119 to the right.

As a result, the right hand end of the stop-supporting shaft 119 strikes one arm of a bell crank 241, (Figs. 3 and 8), rocking the latter to cause its remaining arm, extending beneath the tail of the clutch releasing latch 233, to displace the latch and free the general operator clutch 166 for operation.

Since the motor has already started to rotate the general operator shaft 174, the general operator clutch pawl 229 engages its ratchet 232, Fig. 8, on the shaft 174, and the general operator sleeve 165 with its differentially stepped member 162, (Fig. 1), and the function controlling cams 170, 171, 172 and 173, start to rotate.

Substantially the first half rotation of the general operator is devoted to the rotation of the stepped flights 163 of the differential 162 past the selector gear 147, to impart a differential movement to the gear, the extent of which movement is, of course, controlled by the relative positions axially of the gear and differential.

Thereafter, the function controlling cams 170—173 successively operate, as will be hereinafter referred to.

Meanwhile, the operator has continued to depress the key 25, (Figs. 2–4 and 11–13), and its lever 28, the stud 301 of which continues its control of the arm 300 to maintain the main retaining latch 283, (Fig. 8), disengaged, the spring 288 pressing the auxiliary retaining latch 284 against the stud 286.

At about the time the stud 301 in its downward travel, contacts the high point of the shoulder on the cam arm 300, it presses aside its locking member 302, and upon the escape of the stud below the free end of the locking member, the latter springs back over the stud to prevent the return of the key lever with the consequent disengagement of parts, until the entry of the digit value represented by the key is effected, and the automatic operations dependent upon the motor, are completed.

Also at about the time the operating stud 301 is passing onto the dwell portion of the cam arm 300, the usual adjustable contact screw carried by the key lever 28 contacts the escapement bar 45 to depress the latter. Continued depression of the key 25 causes the adjustable contact to depress the universal bar 45, which, through its bail arms 46, crank arms 47, rocking shaft 48, rocker arms 49 and escapement draw rod 50, trips the holding dog 40 to release the escapement wheel 36 and key carriage 16 to the action of the usual carriage power barrel 20, (Fig. 1).

Ordinarily, as when typing only, this would result in an advance of the carriage through a single increment of letter spacing movement, but due to the prior interposition of the locking pawl 278, (Fig. 8), into the path of a tooth of the escapement wheel 36, the latter, together with the key carriage, is locked against substantial advance, to insure sufficient time in which to enter the value of the particular digit represented by the depressed key, into the column totalizer and crossfooter.

Coincidentally with the withdrawal of the holding dog 40, from the escapement ratchet 36, the spacing dog 41 is advanced, to overlie the same tooth from which the holding dog has just been withdrawn.

It might be thought, therefore, that by delaying the action of the escapement mechanism until after the entry of the digit value into its totalizer wheel, the step of escapement would fail to occur, because the return of the numeral key 25 by its restoring spring 27', and the consequent release of the universal escapement member bar 45 for return by its spring (not shown) might result in the resumption by the holding dog 40, (Fig. 8), of its original position, before the escapement locking pawl 278 is shifted to its ineffective position.

As heretofore stated, however, sufficient clearance is left between the toothed end of the locking pawl 278 and the adjacent tooth of the escapement ratchet 36 to enable the engagement and disengagement of the locking pawl relatively to the ratchet.

Consequently, when the locking pawl 278 shifts to effective position relatively to the ratchet, there is present the slight clearance, which is taken up by the slight advance of the ratchet upon the release of the holding dog 40 therefrom as the value key completes its down stroke.

Such clearance enables an advance of the ratchet sufficient to interpose the end of that tooth just released by the holding dog into the return path of the holding dog, so that during the first part of the upstroke of the key, by which time the locking pawl 278 will have been elevated to idle position, the spacing dog 41 is withdrawn from the escapement ratchet, and the holding dog 40, being unable to re-enter the ratchet in front of the tooth which it just previously released, perforce must engage the succeeding tooth, thus enabling the escapement ratchet to make a complete step of movement.

Failure of the letter spacing escapement mechanism to operate as a result of a quick depression and release of a numeral key is not possible for the reason that the key locking finger 302, lying in the return path of the stud 301 on the depressed key lever 28, blocks the restoration of the key to its normal position, until such locking finger is rocked out of the path of the stud.

In other words, the locking finger 302 operates to retain the key and universal bar 45 depressed, with the escapement holding dog 40 in its tripped position until after the disengagement of the escapement locking pawl 278 from the escapement wheel 36.

The release cam 171, (Figs. 1 and 14), forming part of the differential gear assembly, turns synchronously with the differential member, the release cam being so arranged relatively to the graduated flights or teeth 163 of the differential member 162 that the cam does not contact the arm 311 of the releasing bell crank 312, 311, entrained with the escapement locking pawl 278 until the toothed portion of the differential member 162 completes its travel past the selector gear 147.

Thereupon, the cam 171 acts upon the bell crank 311, 312, forcing the vertical rod 280 downwardly, against the tension of spring 281, to first disengage the escapement locking pawl 278 from the escapement wheel 36, thus freeing the escapement wheel to the action of its carriage feed spring drum 20.

Immediately succeeding the release of the locking pawl 278 from the escapement wheel 36, the vertical link 280, by its pin and slot connection 305, 306, (Fig. 14), with the arm 304, rocks the bail 303 clockwise, which bail, acting upon the face 308 of the effective locking finger 302, rocks the finger to its idle position, and thus frees the key 25 and its key lever 28 for return by their spring 27'.

The stud 301 projecting from the key lever 28 thus frees the cam arm 300, together with its shaft 291, arm 292 and vertical link 295 controlling the main latch 283 for the escapement locking pawl 278.

Thereupon, the tensioned spring 298, (Fig. 8), at the right hand end of shaft 291, restores the shaft with its cam arms 300, and rearwardly projecting arm 292, to their normal positions, shown in Figs. 4, 14 and 15, the arm 292 operating the link 295 to forcibly rock the main latch 283 over the locking stud 286 on the tail of the locking pawl 278, to hold the locking pawl idle. And this operation occurs even though the operator maintains the key 25 depressed. Return of the main latch 283 relaxes the tension of the latch-connecting spring link 288, and the stop 289 of the main latch, upon such return, strikes the stop pin 290 of the auxiliary latch to displace the auxiliary latch relatively to the locking stud 286 of the locking pawl.

The actuating cam 171, (Fig. 14), after its operation of the bell crank 311, 312, and link 280, to disengage the escapement locking pawl 278 from the escapement wheel 36, escapes past the bell crank.

The locking pawl 278 is thus again placed under control of the numeral keys 25.

The resetting cam 170, (Figs. 5, 8 and 19), next operates upon a roll 324 mounted intermediate the ends of the restoring lever 322 to rock the latter downwardly. The restoring lever, in turn, rocks the bell crank 319 connected to the selector gear carriage 150, returning such carriage with its gear 147 to the left a sufficient distance to clear the latch 154, (Figs. 2, 11 and 13), which latch, due to the projection of the stop 120, has remained disabled since it released the carriage.

The cam 170 is of such extent as to momentarily maintain the gear carriage 150 in its overthrown return position until the restoration of the latch 154 by cam 172.

The gear carriage 150, upon its withdrawal towards and slightly past its starting position, frees the stop carrying shaft 119 and bell crank 241 to the action of the spring 235, (Fig. 3), acting upon the tail of the clutch pawl disengaging dog 233, which returns the disengaging dog to its effective position, ready to contact the clutch pawl 229, and in so doing, the spring returns the stop-carrying shaft 119 and its series of stops 120, axially, until arrested by contact of the collar 119ᵃ, (Fig. 9), of the stop-carrying shaft against the side plate 121 of the frame.

While this is occurring, the cam 172, (Figs. 5, 11 and 13), contacts the roll 325 of the bail 158, 160, which roll is positioned at such distance behind the roll 324 of the restoring lever 322 that the two cams 170 and 172 effect their restoring functions substantially simultaneously.

The cam 172 rocks downwardly the bail 158, 160 to restore the latch 154 to effective position in the path of the gear carriage 150, after which the cam 170 may escape past its roll 324, to permit the feed spring 153 to advance the gear carriage to contact the latch 154.

The bail 159, 160 restores the set stop 120, and projects forwardly the corresponding slide lever 126 against the tension of the spring 130, to position its shoulder 133 ahead of the stop bar 132, the nose 129 of the slide lever shifting forwardly over the electric contact control bail 206, and when the shoulder 133 clears the stop bar 132, the contact breaking spring 208, (Fig. 4), rocks the contact control bail 206 upwardly to interrupt the motor circuit, and to latch the shoulder 133 of the slide lever 120 on the stop bar 132.

As the cam 172 escapes past the roll 324 on the stop-restoring bail 158, 160, the clutch disabling dog 233 is engaged by the general operator clutch pawl 229 to disengage the clutch 166, and thus interrupt the power train from the motor to the general operator when the latter has completed a single rotation.

If, at the return of the slide lever 126 to its normal position, the key 25 has been released by the operator, the hook 143 re-engages the lug 145 of the slide lever preparatory to again initiating the foregoing operations, but the slide lever will be latched to the stop bar 132 whether or not the key 25 has been released.

The foregoing constitutes a detailed description of a preferred embodiment of my invention, but right is herein reserved to such changes and modifications as fall fairly within the scope of the appended claims.

What I claim is:

1. In a machine of the class described, having a travelling carriage, keys, and a motor; the combination of carriage locking mechanism under control of said keys, to lock the carriage against movement; means operative by said motor, to forcibly displace the carriage locking mechanism, to unlock the carriage irrespective of the keys, and manipulative means to discontinue the control by the keys of the carriage locking mechanism.

2. In a machine of the class described, the combination with a travelling carriage, a carriage escapement, and keys controlling the escapement, of escapement locking mechanism tending to lock the escapement and movable to unlocking position, and means for retaining said mechanism in unlocking position, including normally effective and ineffective latching members, respectively, the former displacing the latter from effective position when the latter has become effective and itself movable by said keys to ineffective position.

3. In a machine of the class described, the combination with a carriage, a carriage escapement, and keys controlling the escapement, of escapement locking means tending to lock the escapement and movable to unlocking position, means for retaining said locking mechanism in unlocked position, including a latch operative to ineffective position, a shaft, cooperating means on the keys and shaft, respectively, for rocking said shaft by operation of said keys, and operating connections between said shaft and said latch.

4. In a machine of the class described, the combination with a carriage, a carriage escapement, and keys controlling the escapement, of escapement locking mechanism tending to lock the escapement and movable to unlocking position, means for retaining said locking mechanism in unlocking position, and including a latch operative to ineffective position, a shaft, cooperating means on the shaft and keys, respectively, for rocking the shaft by operation of the keys, operating connections between the shaft and latch adapted for disconnection, to disable the escapement locking mechanism, and means, including a key, for disconnecting said connections.

5. In a machine of the class described, the combination with a travelling carriage, a carriage escapement, and keys controlling said escapement, of escapement locking mechanism, including an escapement locking pawl tending to lock the escapement and movable to unlocking position, a latching means for retaining the pawl in unlocking position, including a lug on said pawl, a pair of opposed normally effective and ineffective latches, respectively, adapted for latching cooperation with said lug, and the normally effective latch displacing the normally ineffective latch from effective position, and operative to ineffective position, respectively; a shaft; means for rocking the shaft by operation of said keys, and operating connections between said shaft and said normally effective latch member.

6. In a typewriting machine, having depressible type keys, and a power drive; the combination of a normally ineffective key-locking mechanism; means operable upon depression of a key to render the key-locking mechanism effective to prevent return of the key during a cycle of operation of the power drive; means operable by the power drive to restore the key-locking mechanism to its ineffective position at the end of such cycle of operation; means to maintain the key-locking mechanism normally ineffective; and settable means to render the key-locking mechanism wholly ineffective during one or more key operations.

7. In a machine of the class described, the combination with depressible value keys, and a power drive including a motor-driven member having a single cycle of movement as an incident to depression of each key, of key locking mechanism for locking the keys in depressed position, including key locking members movable to key-obstructing position, a bail movable in opposite directions to move said key-locking members to and from obstructing positions, respectively, and means for automatically moving said bail in one direction under control of said keys, and operative in the opposite direction by said motor-driven member.

8. In a writing-adding machine, the combination with a travelling carriage; a carriage escapement; keys to control the escapement; and power-operated means; of means normally tending to lock the escapement; a key-controlled latch to normally retain the escapement locking means idle; means operable by the power-operated means, to return the escapement locking means to idle position; and a second latch operable when the first-named latch is idle, to retain the escapement locking means in idle position, and displaceable by the first-named latch on the return of the latter to effective position.

9. In a writing-computing machine, the combination with a travelling carriage; escapement mechanism therefor; keys to control the escapement; and locking means for the escapement; of means to retain the escapement locking means ineffective, including a latch, a shaft common to the several keys, means fast on the shaft and individual to the respective keys, to enable any key to rock the shaft; operating connections between the shaft and latch to enable any key to displace the latch; and a manipulative means to disable the operating connections.

10. In a writing-calculating machine, the combination with a traveling carriage; keys; a motor; and a carriage-locking mechanism; of means to normally retain the carriage-locking mechanism in idle position; key-controlled means to release the retaining means to permit the locking mechanism to become effective; and a motor-driven member to positively restore the key-controlled carriage-locking mechanism to its idle position.

11. The combination with a travelling carriage; keys; and a motor; of carriage-locking mechanism; means controlled by any of the keys upon the depression thereof, to shift the carriage-locking mechanism to effective position; means operable by the motor to positively render ineffective the carriage-locking mechanism, to release the carriage irrespective of the position of any of the keys; and key-locking mechanism operatively connected with the carriage-locking mechanism for actuation therewith, to lock and release the keys coincidentally with the locking and release of the carriage, respectively.

12. The combination with a travelling carriage; and keys; of normally idle carriage-locking mechanism under control of the keys for determining its effective operation; means controlled by any of the keys upon the depression thereof, to shift the carriage-locking mechanism to effective position; power-driven means to return the carriage-locking mechanism to its normal idle position; key-locking means connected for operation with the carriage-locking mechanism, to lock and to release a key coincidently with the locking and the release of the carriage, respectively; and means to disable the key-control of the carriage-locking mechanism, and the key-locking means.

13. The combination with a travelling carriage; a carriage escapement; numeral keys to control the escapement; and a motor; of means normally unconnected with the escapement, and interposable in the path thereof, upon depression of a key, to lock the escapement against operation; and motor-operated means to return the escapement locking mechanism to its normal position notwithstanding continued depression of a key.

14. The combination with a travelling carriage; keys; and a motor; of normally cocked carriage-locking mechanism, adapted to be tripped under control of the keys, to lock the carriage; means operable by the motor to restore the carriage-locking mechanism to its cocked position; and means to retain the carriage-locking mechanism in cocked position, including a normally effective, latching member displaceable by the keys; and a normally idle latching member effective to latch the carriage-locking mechanism in cocked position, upon the restoration of the carriage-locking mechanism to its cocked position, while a key remains depressed.

15. The combination with a travelling carriage; keys; and a motor; of normally cocked carriage-locking mechanism, adapted to be tripped under control of the keys, to lock the carriage; means operable by the motor to restore the carriage-locking mechanism to its cocked position; and means to retain the carriage-locking mechanism in cocked position, including a normally effective latching member displaceable by the keys; and a normally idle latching member effective to latch the carriage-locking mechanism in cocked position, upon the restoration of the carriage-locking mechanism to its cocked position while a key remains depressed, and itself displaceable by the normally effective latch member incident to the return of the normally effective latch member.

16. In a machine of the class described, the combination with a travelling carriage; and numeral keys; of normally idle carriage-locking mechanism; means controlled by any of the numeral keys upon depression, to render the carriage-locking mechanism effective to lock the carriage; power-driven means to restore the carriage-locking mechanism to its normal idle position; and key-locking mechanism connected with and controlled by the carriage-locking mechanism to lock and to release the numeral keys.

17. In a writing-calculating machine, the combination with a travelling carriage; numeral keys; and a motor: of carriage-locking mechanism to lock and release the carriage; key-locking mechanism controllable by the carriage-locking mechanism, to lock and to release the numeral keys; means operable by any of the numeral keys upon depression thereof, to control the locking operation of the carriage-locking and key-locking mechanisms; and means operable by the motor to displace the carriage-locking mechanism to release the carriage and to displace the key-locking mechanism to permit the return of the depressed key to normal position.

18. In a writing-calculating machine, the combination with a travelling carriage; numeral keys; and a motor: of carriage-locking mechanism to lock and release the carriage; normally idle key-locking mechanism controllable by the carriage-locking mechanism, to lock and to release the numeral keys, a latch normally effective to retain the carriage-locking mechanism and the key-locking mechanism in idle positions; means operable by a numeral key to shift the latch to ineffective position to release the carriage-locking mechanism for operation; means operable by the carriage-locking mechanism to shift the key-locking mechanism to effective position; and means operable by the motor to displace the carriage-locking and key-locking mechanisms, respectively, to release the carriage, and to free the depressed key for return to normal position.

19. The combination with a travelling carriage; numeral keys; and a motor; of normally idle carriage-locking mechanism; normally ineffective key-locking mechanism; means controlled by any of the numeral keys to render the carriage-locking mechanism effective; means controlled by the carriage-locking mechanism to render the key-locking mechanism effective; and motor-operated means to restore the respective carriage-locking and key-locking mechanisms to their idle positions.

20. In a writing machine, the combination with a travelling carriage; keys; and a motor; of key-controlled carriage-locking mechanism to lock the carriage; means operable by the motor to shift the carriage-locking mechanism to ineffective position; key-locking mechanism to lock any operated key against return; and a connection between the carriage-locking and key-locking mechanisms to enable the motor to shift the key-locking mechanism and release a locked key for return, incident to the shifting of the carriage-locking mechanism by the motor.

21. In a machine of the class described, the combination with a traveling carriage; a carriage escapement; and keys controlling the escapement; of escapement-locking mechanism, including an escapement-locking pawl shiftable into and out of locking relation with the escapement; a pair of latches, individually operable to retain the pawl out of locking relation with the escapement, one of the latches normally effective to retain the pawl in idle position, and the other normally ineffective; means under control of the keys to displace the normally effective latch to enable the escapement-locking pawl to lock the escapement; means to return the escapement-locking pawl to its idle position; and means to cause the normally ineffective latch to become effective upon the return of the pawl to idle position in case of failure of the normally effective latch to return to effective position.

22. In a writing-calculating machine, the combination with a traveling carriage; carriage escapment mechanism; numeral keys controlling the escapement; and a power drive; of escapement-locking mechanism shiftable into and out of locking relation with the escapement; a latch to normally retain the escapement-locking mechanism ineffective; a normally ineffective key-locking mechanism to lock the actuated key in actuated position; means under control of the keys to free the escapement-locking mechanism for operation; connections operable by the escapement-locking mechanism to render the key-locking mechanism effective; and means operable by the power drive to restore the key-locking mechanism and the escapement-locking mechanism to their normal ineffective positions.

23. In a writing machine, the combination with a traveling carriage; carriage escapement mechanism; keys to control the escapement; and a power drive; of normally ineffective escapement-locking and key-locking mechanisms; key-controlled means to trip the escapement-locking mechanism for operation; means under control of the escapement-locking mechanism to render the key-locking mechanism effective; and power-driven means to restore the escapement-locking mechanism and the key-locking mechanism to their normal ineffective positions.

24. In a writing machine, the combination with a traveling carriage; carriage escapement mechanism; keys to control the escapement; a power drive; and a normally ineffective escapement-locking mechanism; of a key-locking mechanism normally held ineffective by the escapement-locking mechanism; key-controlled means to render the escapement-locking mechanism, and the key-locking mechanism effective; and means operable by the power drive to render ineffective the escapement-locking and the key-locking mechanisms.

25. In a writing-calculating machine, having a traveling carriage; an escapement therefor; keys to trip the escapement; and a motor; of an escapement-locking mechanism, and a key-locking mechanism, connected for simultaneous movement to their respective effective and ineffective positions; motor-operated means to shift the key-locking and escapement-locking mechanisms to one of their positions; and means to latch the key-locking and escapement-locking mechanisms in such last-named positions.

26. In a writing machine, the combination with keys; a traveling carriage; an escapement therefor, including an escapement ratchet and key-controlled dogs; and a motor; of normally ineffective key-controlled mechanism additional to the key-controlled escapement dogs, engageable with and disengageable from the escapement ratchet to lock and release the carriage; means to shift said key-controlled carriage-locking mechanism to effective position incident to depression of a key; means automatically operable by the motor, to positively release the last-named carriage-locking mechanism, irrespective of the position of a key; and key-locking mechanism, operatively connected with said carriage-locking mechanism for actuation therewith, to automatically lock and release the keys coincidentally with the locking and release of the carriage.

27. In a machine of the class described, having a traveling carriage; and keys; the combination with a carriage-restraining mechanism shiftable to effective and idle positions, respectively; and means for restoring such mechanism to idle position; of a latch normally effective to retain the carriage-restraining mechanism in its idle position; key-controlled means to displace the normally effective latch, to free the carriage-restraining mechanism for operation; means to shift the carriage-restraining mechanism to operative position; and a second latch controlled by the first-named latch to hold the carriage-restraining mechanism in its idle position upon failure of the first-named latch to return to latching relation with the carriage-restraining mechanism upon the restoration of such mechanism to its idle position.

28. In a machine of the class described, having a traveling carriage; and keys; the combination with a carriage-restraining mechanism shiftable to effective and idle positions, respectively; and means for restoring such mechanism to idle position; of a latch normally effective to retain the carriage-restraining mechanism in its idle position; key-controlled means to displace the normally effective latch, to free the carriage-restraining mechanism for operation; means to shift the carriage-restraining mechanism to operative position; and a second latch in the path of the first latch to be controlled thereby, to retain the carriage-restraining mechanism idle, upon failure of the first-named latch to return to its effective position, upon restoration of the carriage-restraining mechanism to its idle position, and displaced by and held in idle position by the first-named latch upon the return of the latter to effective position.

29. In a machine of the class described, the combination with a traveling carriage; and keys; of normally ineffective, mechanism trippable by a key, to restrain the carriage; means to maintain the carriage-restraining mechanism ineffective, including a normally effective latch; means operable by the keys to displace the normally effective latch; means operable upon the displacement of the latch to shift the carriage-restraining mechanism to effective position; means to restore the carriage-restraining mechanism to ineffective position; an auxiliary latch; means to cause the auxiliary latch to become effective to maintain the carriage-restraining mechanism ineffective upon such restoration in case of failure of the normally effective latch; and means to restore the normally effective latch to its operative position and cause said latch, during its return to effective position, to displace the auxiliary latch from effective position.

HARRY A. FOOTHORAP.